United States Patent
Kuronuma

(10) Patent No.: US 10,166,797 B2
(45) Date of Patent: Jan. 1, 2019

(54) PRINTER WHICH SETS A PRINT AREA BASED ON A SCANNED IMAGE OF A MATERIAL ON WHICH PRINTING IS TO BE PERFORMED, METHOD FOR CONTROLLING PRINTER, AND RECORDING MEDIUM

(71) Applicant: CASIO COMPUTER CO., LTD., Shibuya-ku, Tokyo (JP)

(72) Inventor: Hirotaka Kuronuma, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/675,278

(22) Filed: Aug. 11, 2017

(65) Prior Publication Data
US 2018/0086120 A1    Mar. 29, 2018

(30) Foreign Application Priority Data

Sep. 27, 2016 (JP) ................................. 2016-187676
Mar. 14, 2017 (JP) ................................. 2017-048823

(51) Int. Cl.
| | |
|---|---|
| *B41J 19/14* | (2006.01) |
| *B41J 19/20* | (2006.01) |
| *H04N 1/193* | (2006.01) |
| *B41J 11/00* | (2006.01) |
| *B41J 3/36* | (2006.01) |
| *B41J 2/175* | (2006.01) |

(52) U.S. Cl.
CPC ............. *B41J 19/14* (2013.01); *B41J 3/36* (2013.01); *B41J 11/0095* (2013.01); *B41J 19/205* (2013.01); *H04N 1/193* (2013.01); *B41J 2/1752* (2013.01)

(58) Field of Classification Search
CPC ........................................................ B41J 19/14
USPC .......................................................... 358/1.18
See application file for complete search history.

(56) References Cited

U.S. PATENT DOCUMENTS

| | | | |
|---|---|---|---|
| 6,999,113 B1* | 2/2006 | Omura | G03B 17/02 348/207.2 |
| 2003/0095160 A1* | 5/2003 | Ogiwara | H04N 1/00278 347/16 |
| 2014/0078222 A1* | 3/2014 | Sakai | G06F 3/1236 347/54 |

FOREIGN PATENT DOCUMENTS

JP    05330150 A    12/1993

* cited by examiner

*Primary Examiner* — Jacky X Zheng
(74) *Attorney, Agent, or Firm* — Holtz, Holtz & Volek PC

(57) ABSTRACT

A printer includes: a processor; a print head configured to perform printing in accordance with input print data; and a scanner configured to acquire an image of a material to be printed. The processor is configured to detect at least one line extending in a first direction on the material to be printed from the image acquired by the scanner when moving of the printer in a moving direction in which the scanner is on the front side of the print head, and set a print area along the first direction based on the line on the material to be printed, and the print head prints in the print area.

12 Claims, 20 Drawing Sheets

MAIN SCANNING DIRECTION

MAIN SCANNING DIRECTION

MAIN SCANNING DIRECTION

SIZE AND COORDINATES OF PRINTER AT BOTTOM FACE

SIZE AND COORDINATES OF FRAME

SIZE AND COORDINATES OF PRINT DATA

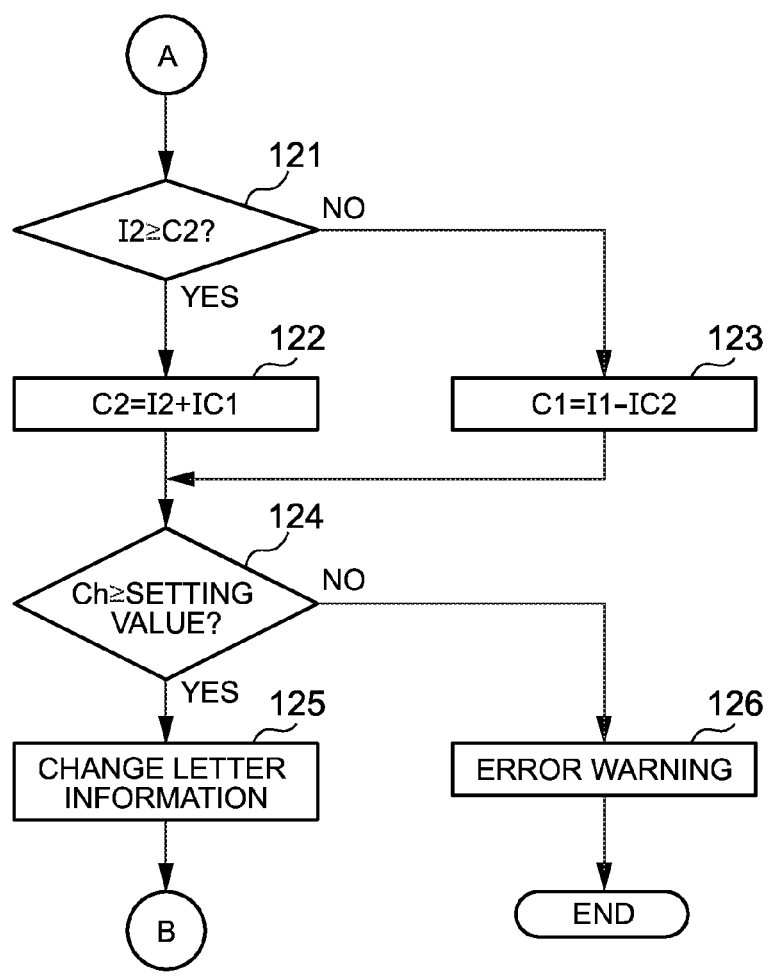

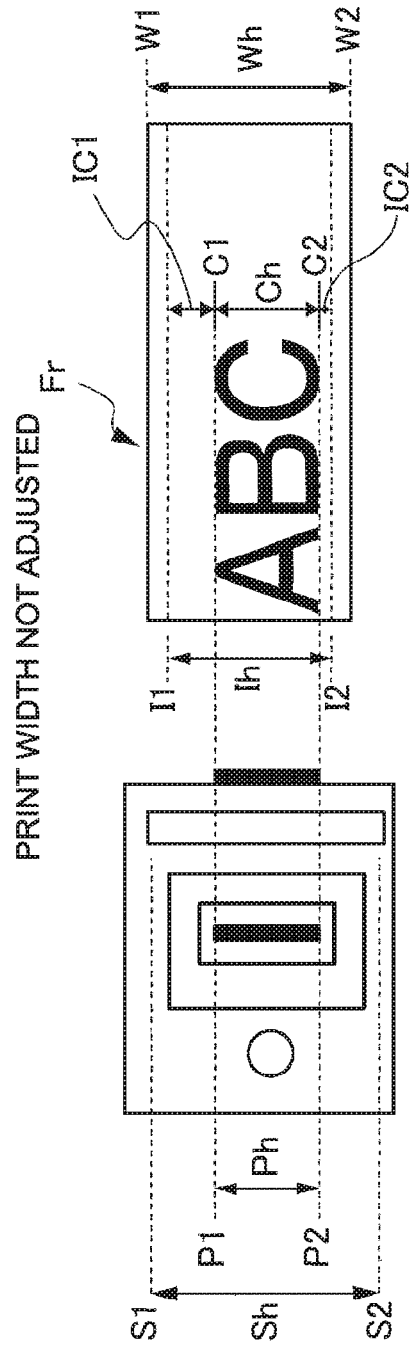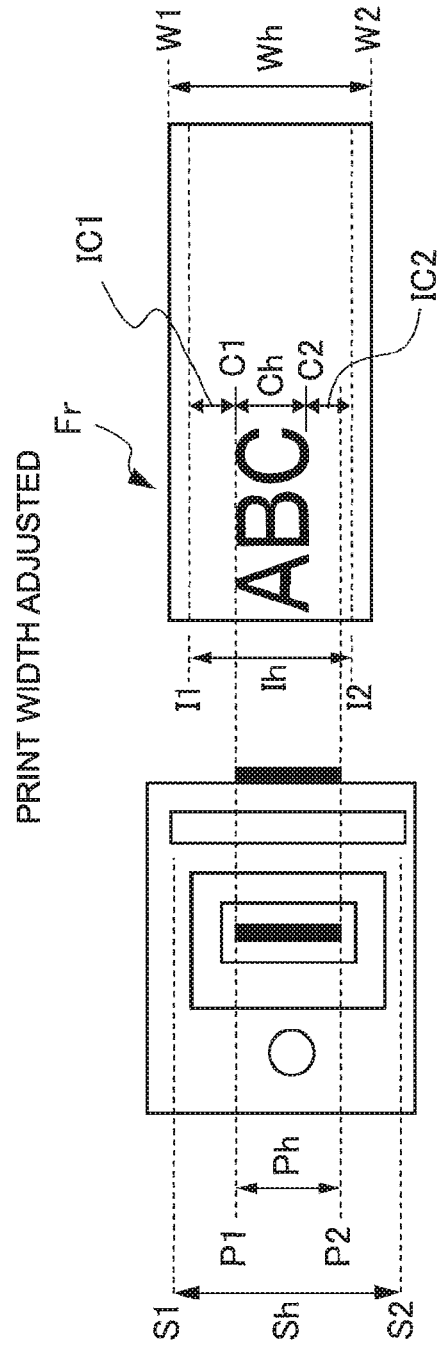

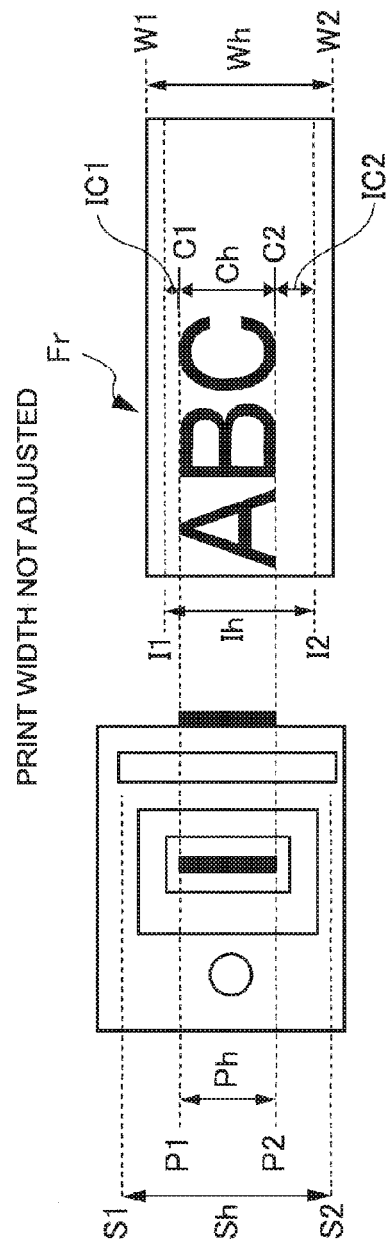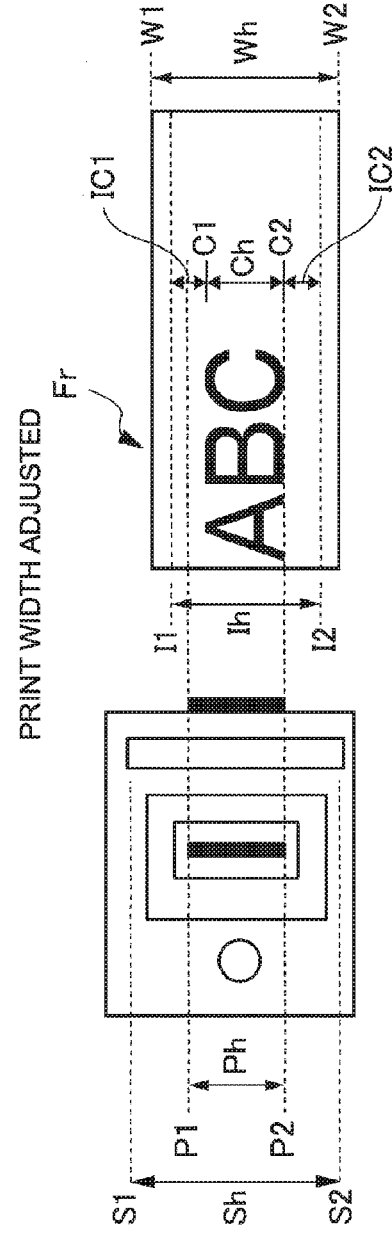

PRINT WIDTH NOT ADJUSTED

PRINT WIDTH ADJUSTED

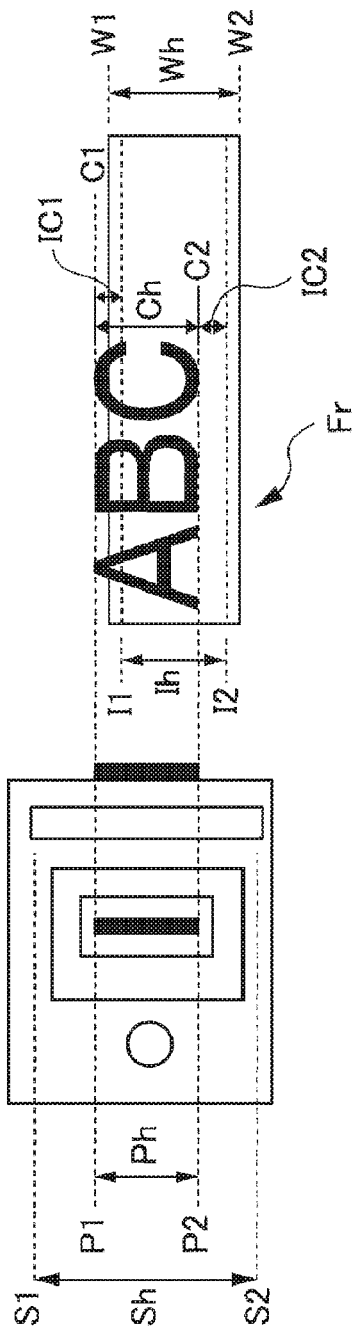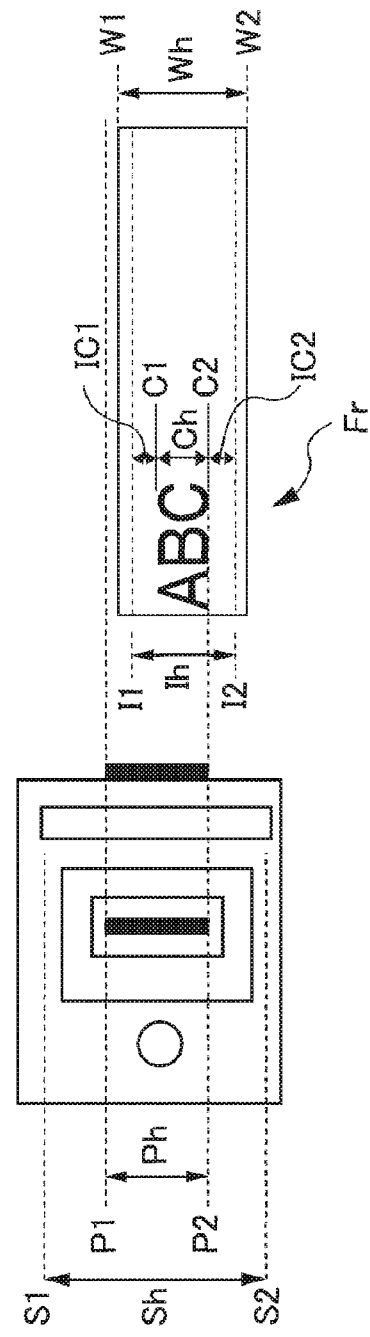

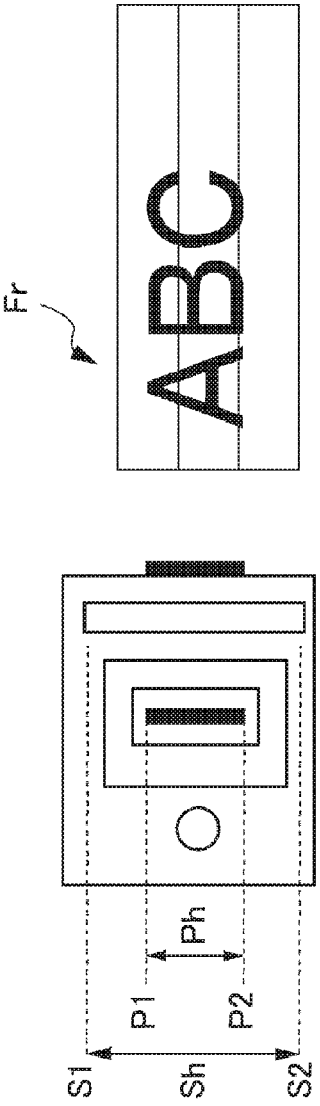
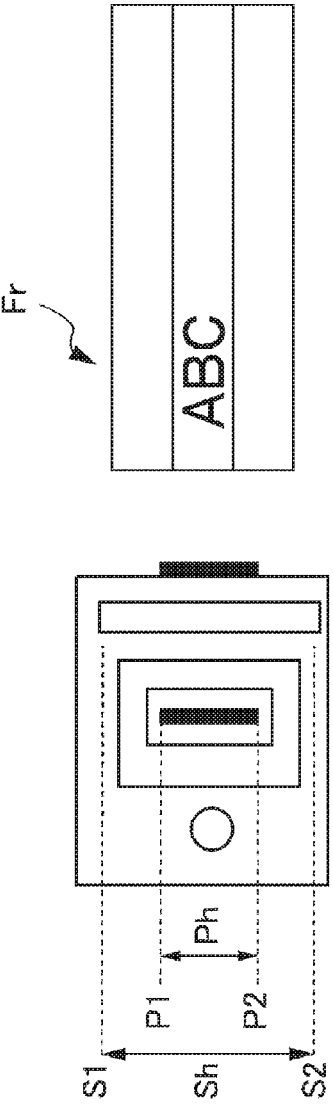

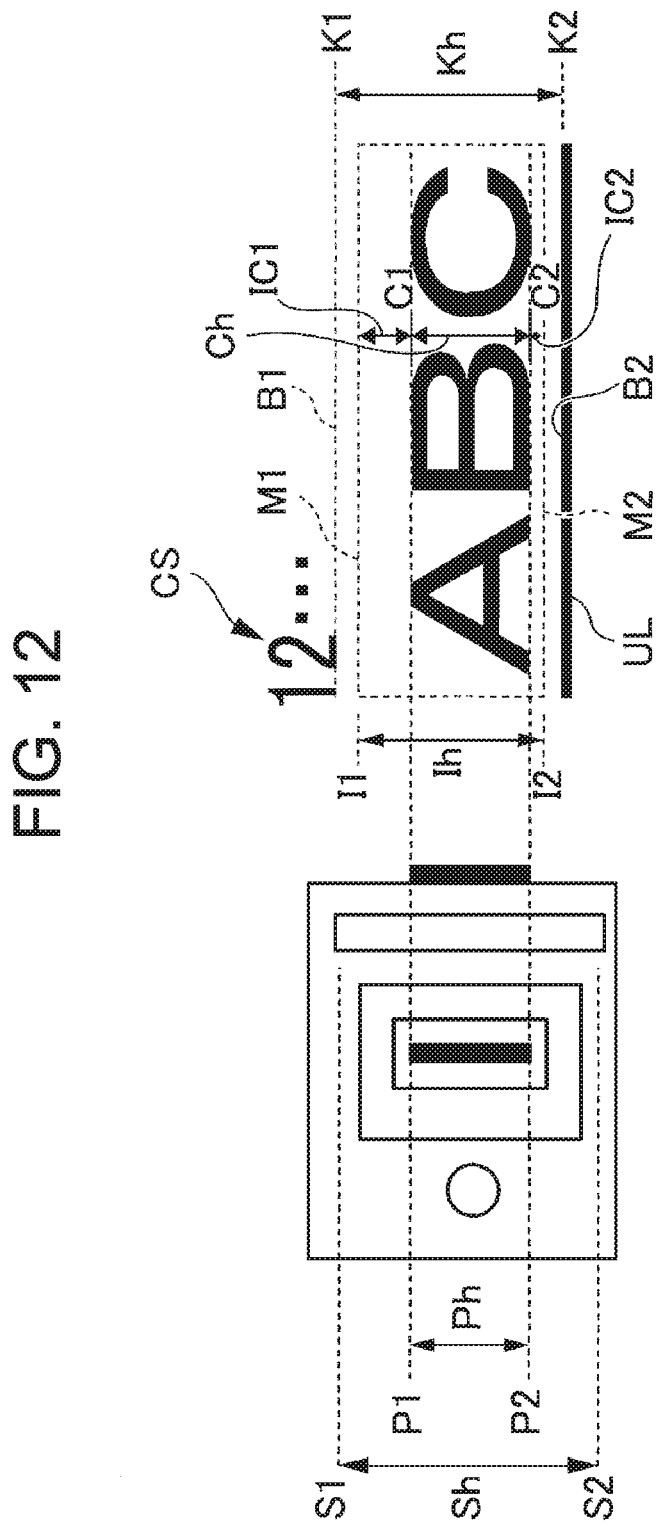

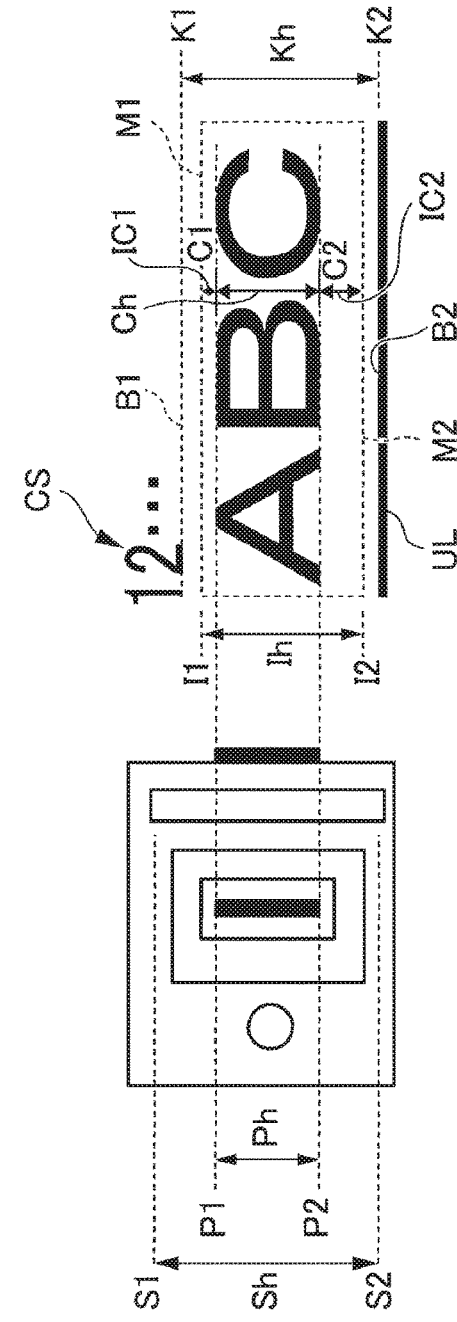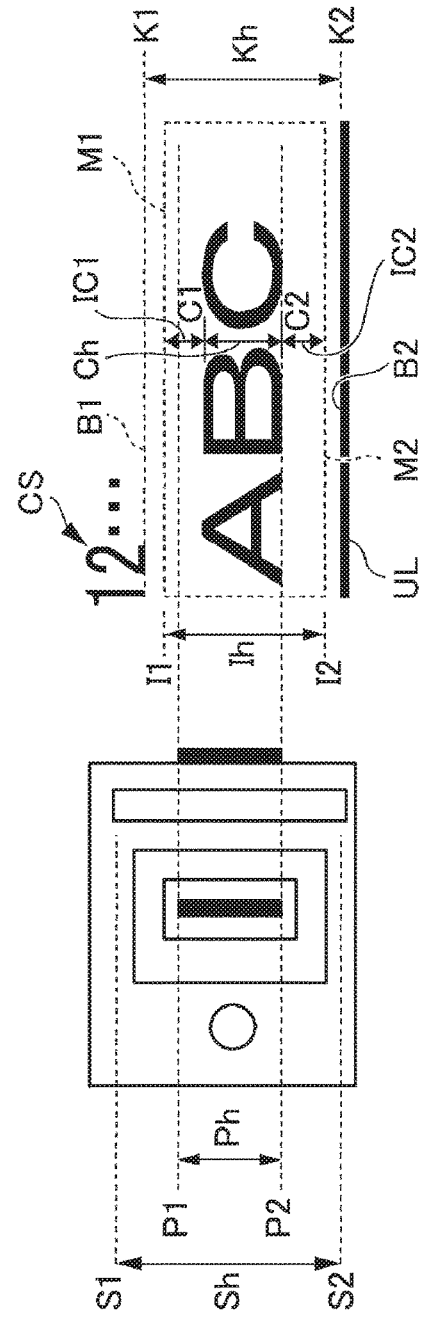

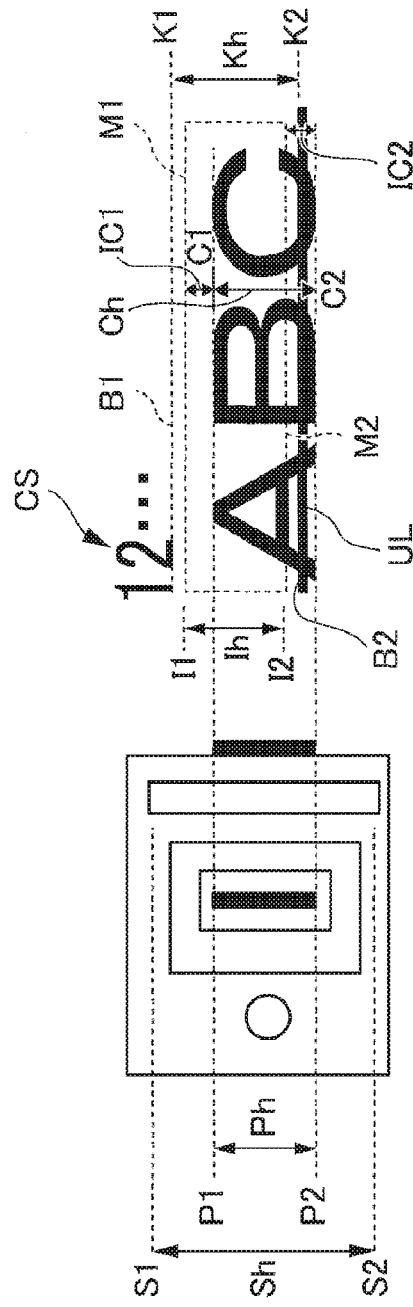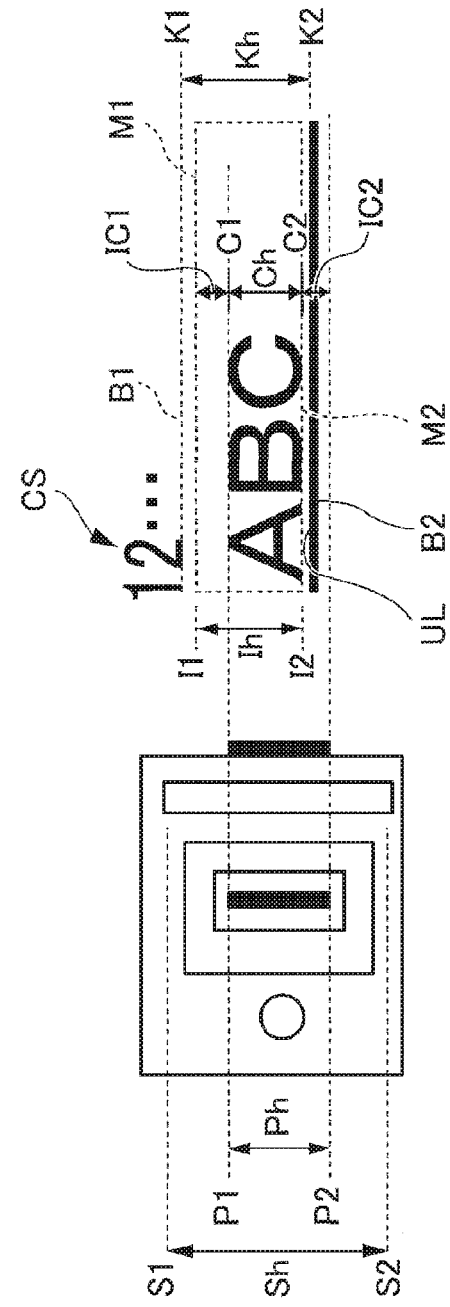

PRINTER WHICH SETS A PRINT AREA BASED ON A SCANNED IMAGE OF A MATERIAL ON WHICH PRINTING IS TO BE PERFORMED, METHOD FOR CONTROLLING PRINTER, AND RECORDING MEDIUM

BACKGROUND OF THE INVENTION

1. Field of the Invention

The present invention relates to a printer, a method for controlling a printer, and a recording medium.

2. Description of the Related Art

A printer is disclosed, with which a user prints data on a sheet by holding the printer with a hand and moving a print part of the printer while bringing it in contact with the sheet. The printer is configured to divide data of a document of one page into n parts, and print the data of each part with auxiliary lines. For instance, Patent Document JP H5-330150 discloses a printer of this type.

Some of materials to be printed have a frame line printed beforehand, in which data such as a name is to be filled in.

In such a case, it is important to print the data within the frame line.

SUMMARY OF THE INVENTION

In view of this circumstance, the present invention aims to provide a printer, with which a user can print data in a designated range of a material to be printed correctly while moving the printer manually in a main scanning direction.

According to an embodiment of the present invention, a printer includes: a processor; a print head configured to perform printing in accordance with input print data; and a scanner configured to acquire an image of a material to be printed, wherein the processor is configured to detect at least one line extending in a first direction on the material to be printed from the image acquired by the scanner when moving of the printer in a moving direction in which the scanner is on the front side of the print head, and set a print area along the first direction based on the line on the material to be printed, and the print head prints in the print area.

According to an embodiment of the present invention, a method for controlling a printer, the printer including: a print head configured to perform printing in accordance with input print data; and a scanner configured to acquire an image, including: an image acquisition step of, when the printer moves in a moving direction in which the scanner is on the front side of the print head, acquiring an image on a material to be printed with the scanner; an area setting step of detecting at least one line extending in a first direction on the material to be printed from the image acquired by the scanner, and setting a print area along the first direction based on the line on the material to be printed; and a print step of printing in the print area.

According to an embodiment of the present invention, a recording medium having stored thereon a program for a printer including: a controller; a print head configured to perform printing in accordance with input print data; and a scanner configured to acquire an image, the program making the controller execute at least the steps of: an image acquisition step of, when the printer moves in a moving direction in which the scanner is on the front side of the print head, acquiring an image on a material to be printed with the scanner; and an area setting step of detecting at least one line extending in a first direction on the material to be printed from the image acquired by the scanner, and setting a print area along the first direction based on the line on the material to be printed.

BRIEF DESCRIPTION OF THE SEVERAL VIEWS OF THE DRAWING

FIG. 1A is a cross-sectional view of the printer, and FIG. 1B is a bottom view of the printer.

FIG. 3A shows the printer viewed from the bottom face, FIG. 3B shows a frame printed on a material to be printed, and FIG. 3C shows print data.

FIG. 4B is a flowchart showing a remaining part of the operation of the printer according to the first embodiment of the present invention.

FIGS. 5A and 5B explain the adjustment of a print width of the first embodiment of the present invention. FIG. 5A shows the case where data is printed at a lower part of a frame without adjusting the print width, and FIG. 5B shows the case where the print width is adjusted.

FIGS. 6A and 6B explain the adjustment of a print width of the first embodiment of the present invention. FIG. 6A shows the case where data is printed at an upper part of a frame without adjusting the print width, and FIG. 6B shows the case where the print width is adjusted.

FIG. 7A shows the case where data is printed downward beyond the frame without adjusting the print width, and FIG. 7B shows the case where the print width is adjusted.

FIGS. 8A and 8B explain the adjustment of a print width of the first embodiment of the present invention. FIG. 8A shows the case where data is printed upward beyond the frame without adjusting the print width, and FIG. 8B shows the case where the print width is adjusted.

FIGS. 9A and 9B explains the adjustment of a print width of the first embodiment of the present invention, including three frames or more. FIG. 9A shows the case where data is printed without adjusting the print width, and FIG. 9B shows the case where the print width is adjusted.

FIG. 12 explains the adjustment of a print width of the second embodiment of the present invention, showing the case where data is printed within a print area without adjusting the print width.

FIGS. 13A and 13B explain the adjustment of a print width of the second embodiment of the present invention. FIG. 13A shows the case where data is printed at an upper part of a print area without adjusting the print width, and FIG. 13B shows the case where the print width is adjusted.

FIGS. 14A and 14B explain the adjustment of a print width of the second embodiment of the present invention. FIG. 14A shows the case where data is printed downward beyond the print area without adjusting the print width, and FIG. 14B shows the case where the print width is adjusted.

FIG. 15A shows the case where data is printed upward beyond the print area without adjusting the print width, and FIG. 15B shows the case where the print width is adjusted.

FIG. 16A shows the case where data is printed downward beyond the print area without adjusting the print width, and FIG. 16B shows the case where the print width is adjusted.

DETAILED DESCRIPTION OF THE INVENTION

Figure 1A:
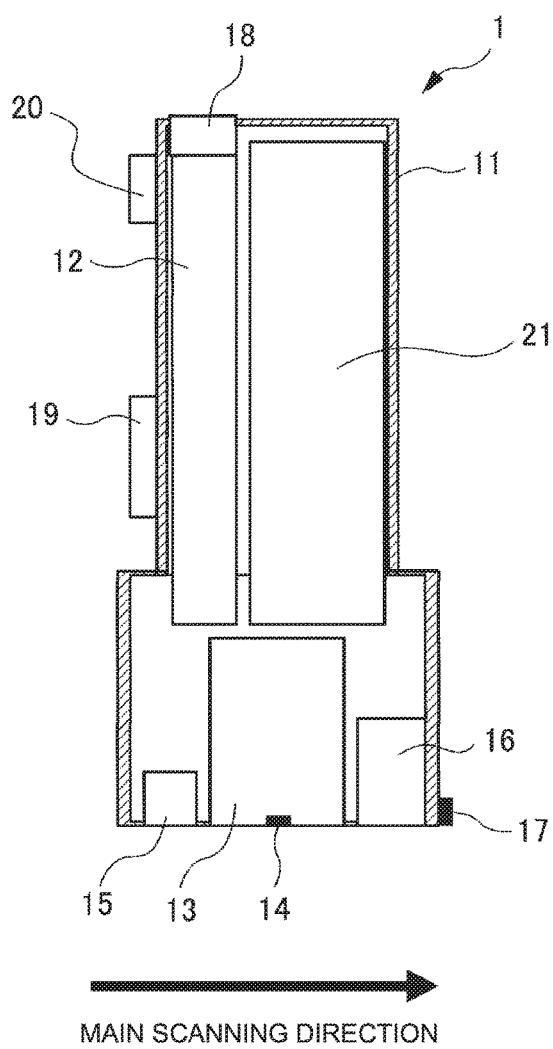
FIGS. 1A and 1B show the configuration of a printer according to a first embodiment of the present invention.

The following describes embodiments of the present invention in details, with reference to the attached drawings. Like reference numerals indicate like parts throughout the description of the embodiment.

First Embodiment

[Configuration of Printer]

Figure 1B:
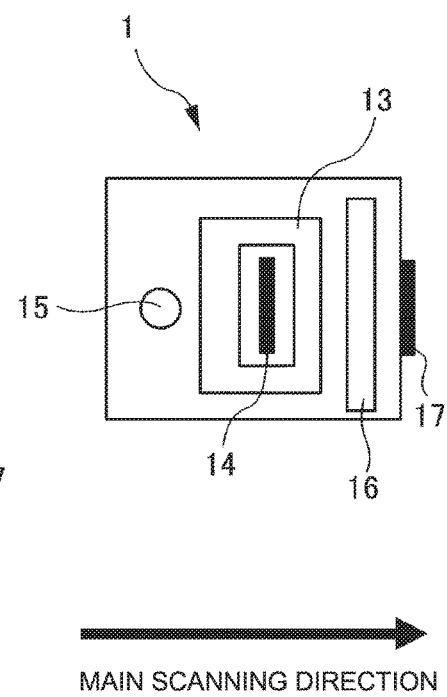

FIGS. 1A and 1B show the configuration of a printer 1 according to a first embodiment of the present invention. FIG. 1A is a cross-sectional view of the printer 1, and FIG. 1B is a bottom view of the printer 1.

Figure 2:
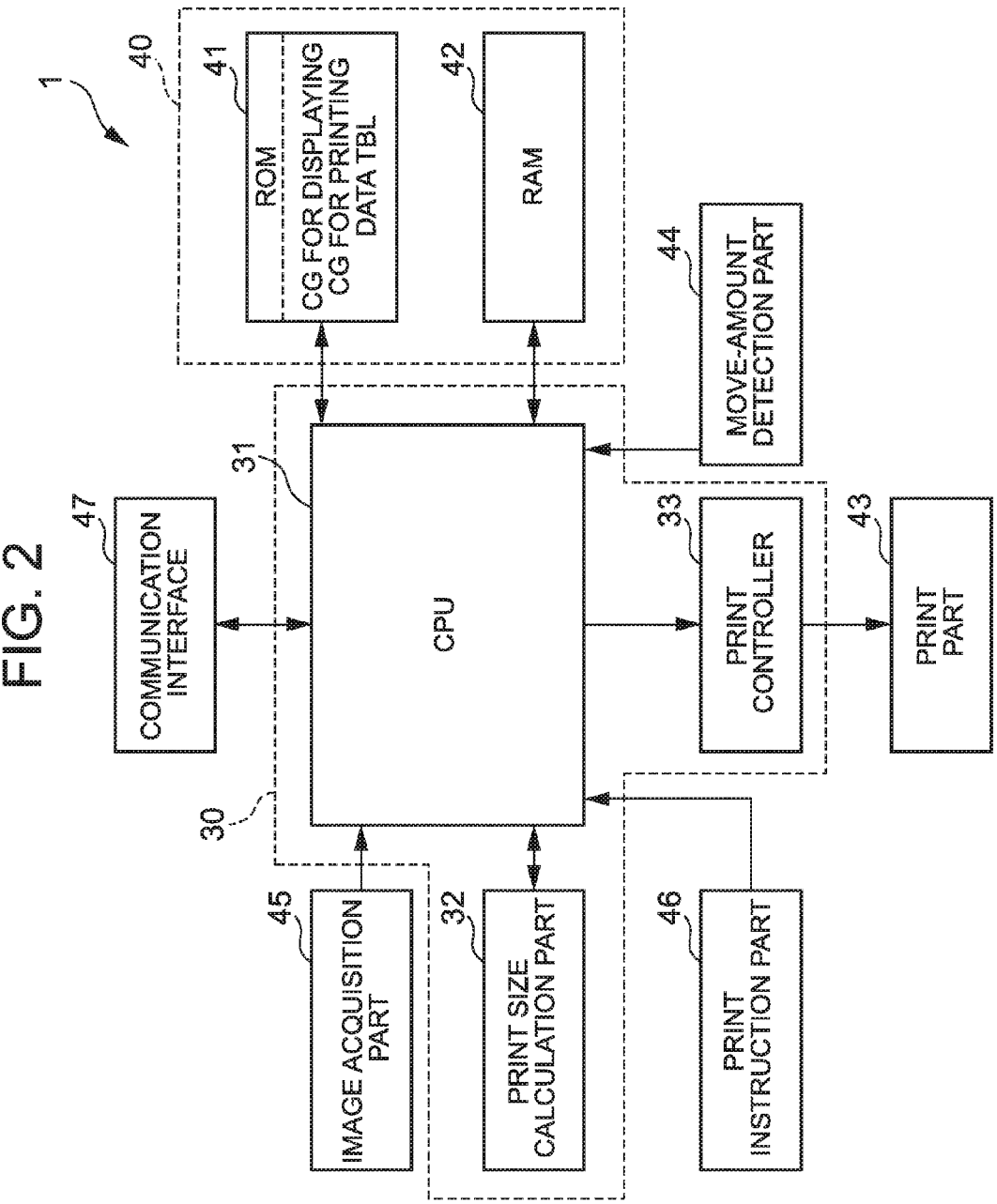
FIG. 2 is a block diagram of the functional configuration of the printer according to the first embodiment of the present invention.

FIG. 2 is a block diagram of the functional configuration of the printer 1 according to the first embodiment of the present invention.

Figure 3A:
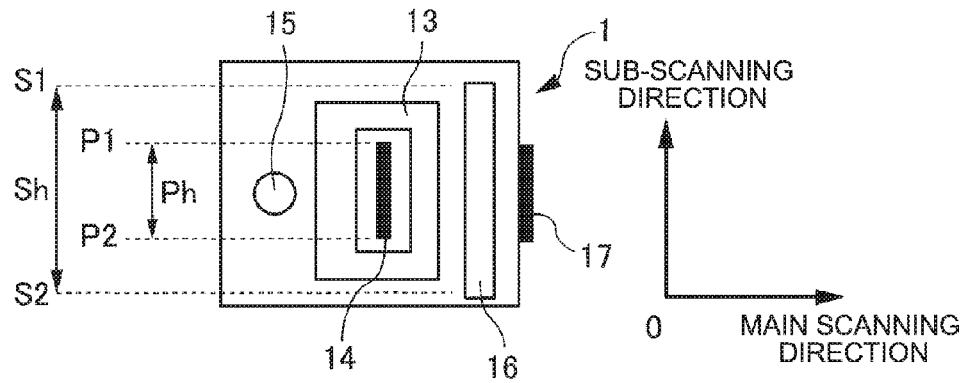
FIGS. 3A-3C explain the size and the coordinates in the first embodiment of the present invention.
Figure 3B:
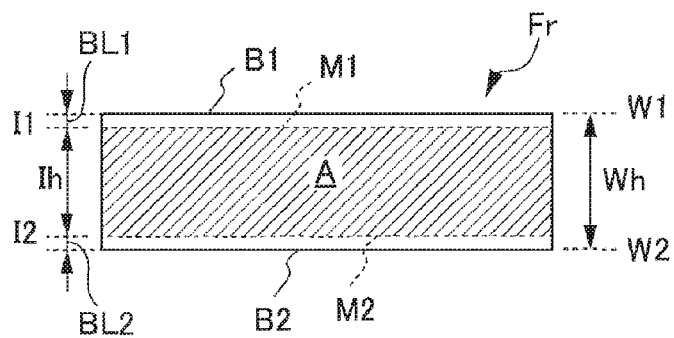
Figure 3C:
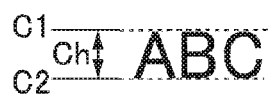

FIGS. 3A-3C explain the size and the coordinates in the first embodiment of the present invention. FIG. 3A shows the printer 1 viewed from the bottom face, FIG. 3B shows a frame Fr printed on a material to be printed, and FIG. 3C shows print data.

The printer 1 is a device (handy printer), with which a user prints data on a material to be printed such as paper while manually moving the printer in a main scanning direction (this may be referred to as a moving direction or a first direction).

As shown in FIGS. 1A and 1B, the printer 1 includes a case 11, a substrate 12, an ink cartridge 13 having a print head 14, an optical sensor 15, a line scanner 16, a print start position marker 17, a user interface 18, a print instruction button 19, a power-source button 20 and a built-in power source 21.

The case 11 is a housing to accommodate the substrate 12, the ink cartridge 13, the optical sensor 15, the line scanner 16, the built-in power source 21 and the like.

The substrate 12 is to mount a CPU 31, a RAM 42, a ROM 41 and the like.

The functions of the CPU 31, the RAM 42, and the ROM 41 are described later.

The ink cartridge 13 is to contain ink, and integrally comes with the print head 14, through which ink is discharged to a material to be printed for printing. The ink cartridge 13 is disposed in the printer 1 so that the print head 14 is located at a face (in this case, the bottom face) opposed to the material to be printed.

As shown in FIG. 3A, the print head 14 has a constant first width Ph in a sub-scanning direction (second direction) orthogonal to the main scanning direction for scanning by a user.

The print head 14 therefore can print with the first width Ph in the sub-scanning direction in accordance with input print data.

The printer 1 may have a removable cap to prevent ink adhering to the print head 14 from drying.

The printer 1 may further include a cradle, for example, to hold the printer 1 when it is not used. Such a cradle is an accessory of the printer 1 to prevent ink adhering to the print head 14 from drying.

The optical sensor 15 is a move-amount detection part 44 (see FIG. 2) to detect the amount of movement of the printer 1 in the main scanning direction. The optical sensor may be one that is typically used in a mouse for PC that includes a laser or a LED to detect the amount of movement.

The optical sensor 15 of the present embodiment is disposed so that its measurement part to detect the amount of movement is located at the bottom face of the printer 1.

The move-amount detection part 44 is not limited to an optical sensor, which may be of a rotary encoder type.

The line scanner 16 is an image acquisition part 45 (see FIG. 2) to acquire an image on the material to be printed. The line scanner is disposed at the printer 1 so that its part to acquire an image is directed to the bottom face of the printer 1.

As shown in FIGS. 1A and 1B, the line scanner 16 is disposed forward of the print head 14 in the main scanning direction (the direction in which the printer will move).

That is, when the printer 1 moves in the main scanning direction, an image on the material to be printed at a part forward of the print head 14 in the main scanning direction can be acquired.

As shown in FIG. 3A, the line scanner 16 has the width Sh in the sub-scanning direction in which an image can be acquired, and the width Sh is wider than the first width Ph of the print head 14 in the sub-scanning direction.

This allows the printer to acquire an image in a region wider than the printable width of the print head 14 in the sub-scanning direction, and so allows the printer to acquire an image for correct understanding of a positional relationship of a frame Fr on the material to be printed with the print head 14 in the sub-scanning direction.

As shown in FIGS. 1A and 1B, the print start position marker 17 is disposed at a lower end and outside of the case 11 that is forward of the print head 14 in the main scanning direction. The print start position marker serves a mark for a user to place the printer 1 on the material to be printed before printing.

More specifically, a user may place the printer 1 on the material to be printed so that the print start position marker 17 aligns with the position of the material to be printed from which the user wants to start printing, and may move the printer 1 for scanning in the main scanning direction. Then, when the print head 14 arrives at the position aligned with the print start position marker 17, the printer starts printing.

The print start position marker 17 includes a light source, such as a LED, to indicate the scanning direction with light for a user. In this way, the print start position marker serves as a guide as well to guide the scanning by the user with the printer 1 in the main scanning direction.

Preferably the width of the print start position marker 17 in the sub-scanning direction is equal to the first width Ph of the print head 14 in the sub-scanning direction for correct understanding by a user about the width in the sub-scanning direction in which graphics and characters (letters, symbols, marks and the like) can be printed.

The user interface 18 is an interface with a user, and includes a liquid crystal screen having a touch-panel function serving as an operating part as well.

This liquid crystal screen serves as an error output part as well, on which an error message is displayed if an error occurs as described later.

In this way, the user interface 18 has a function corresponding to the error output part.

The user interface 18 may include a speaker as the error output part not illustrated. The speaker may output an error message by sound or voice.

The user interface 18 includes a wireless unit for communication with an external terminal (e.g., a mobile phone, a smartphone, a tablet terminal, or a personal computer) as in Wi-Fi, or an external connection port through which a removable recording medium, such as a USB memory or a SD card, can be mounted.

This allows a user to prepare the data to be printed by the printer 1 with an external terminal that can be used in better environment for the preparation, instead of preparing the data with the printer 1. Then, the printer 1 can read such data to be printed prepared with the external terminal for printing.

The print instruction button 19 is an operating button to allow a user to instruct the printer 1 to print.

The power-source button 20 is an operating button to allow a user to turn on or off the power source of the printer 1.

The built-in power source 21 is a power source of the printer 1, which may be a dry cell or a secondary battery, for example.

The printer 1 may include other components. For instance, the printer 1 may include a roller or the like for facilitating moving of the printer for scanning in the main scanning direction. The roller may be disposed at the lower end of the case 11 or at the bottom face of the case 11.

[Functional Configuration of Printer]

Referring next to FIG. 2, the following describes the functional configuration of the printer 1.

As shown in FIG. 2, the printer 1 has functional parts, such as a controller 30, a memory 40, a print part 43, the move-amount detection part 44, the image acquisition part 45, a print instruction part 46, and a communication interface 47.

The move-amount detection part 44 and the image acquisition part 45 include the optical sensor 15 and the line scanner 16 as described above.

The controller 30 is a functional part to control the overall operation of the printer 1, and includes the CPU 31, a print size calculation part 32, a print controller 33 and the like.

Receiving a print instruction from the print instruction part 46 including the print instruction button 19, for example, the CPU 31 determines the contents to be printed in accordance with various types of data stored in the ROM 41 and the RAM 42, a result of calculation by the print size calculation part 32, an image acquired by the image acquisition part 45 and a result of detection by the move-amount detection part 44, and instructs the print controller 33 to print.

The print size calculation part 32 determines the size (print size) of graphics and characters (including letters, symbols and marks) to be printed on the material to be printed and the print position of the graphics and characters in accordance with the position (coordinates) of the print head 14 and the size and the position of a print area A (see FIG. 3B) acquired by the image acquisition part 45.

The print controller 33 transfers the print data (print buffer) stored in the RAM 42 to the print part 43 described later in accordance with the amount of movement of the printer 1 detected by the move-amount detection part 44, and controls the print part 43 to execute printing.

The detailed operation of such a controller 30 is described later.

The memory 40 includes the RAM 42 and the ROM 41.

The RAM 42 temporarily stores data used for calculation by the CPU 31 and print data to be output to the print part 43.

The ROM 41 stores data on graphics and characters (including letters, symbols and pictograms), the size information on these graphics and characters, a table for the print data, various programs and the like to implement the functions of the printer 1.

The print part 43 is a functional part to print on a material to be printed. The print part 43 of the present embodiment includes the ink cartridge 13 having the print head 14.

The print instruction button 46 is the print instruction button 19. When a user manipulates the print instruction button 19, the controller 30 starts to control the printer in association with printing.

The communication interface 47 is a part of the user interface 18, and is an interface receiving various types of data (e.g., print data (templates)) and various programs from a terminal, such as a personal computer or a smartphone.

Specifically the communication interface may be a wireless unit for Wi-Fi or an external connection port through which a USB memory or the like is mounted as described above.

[Processing Executed by Controller]

Next referring mainly to FIGS. 3A-3C, the following describes the processing executed by the printer 1, i.e., the controller 30 in accordance with the sizes of the frame Fr printed on a material to be printed and of print data as well as their positional relationship.

Prior to the specific description of the processing executed by the controller 30, the following firstly describes the printer 1, the sizes of the frame Fr printed on a material to be printed and of print data and their positional relationship (coordinates), followed by various types of processing executed by the controller 30.

Using the terms indicating the directions that are typically used for printers, the following description defines the main scanning direction and the sub-scanning direction as in FIG. 3A.

Note here that the coordinates of the sub-scanning direction are larger when they are away from the axis of the main scanning direction, and larger coordinates in the sub-scanning direction are called an upper side, upward or above, and smaller coordinates in the sub-scanning direction are called a lower side, downward or below in some cases.

In FIG. 3B and FIG. 3C, the frame and the print data are shown based on the axes of coordinates in the main scanning direction and in the sub-scanning direction of FIG. 3A when scanning is performed with the printer 1. In the following, the main scanning direction and the sub-scanning direction in the description referring to FIGS. 3B and 3C are based on the main scanning direction and the sub-scanning direction for the printer 1.

FIG. 3A shows the size and the coordinates of the print head 14 and the line scanner 16 of the printer 1.

The first width Ph of the print head 14 in the sub-scanning direction is indicated as Ph=P1-P2, where P1 denotes the coordinate of the upper end of the print head 14 in the sub-scanning direction and P2 denotes the coordinate of the lower end of the print head in the sub-scanning direction.

The width Sh of the line scanner 16 in the sub-scanning direction is indicated as Sh=S1-S2, where S1 denotes the coordinate of the upper end of the line scanner 16 in the sub-scanning direction and S2 denotes the coordinate of the lower end of the line scanner in the sub-scanning direction.

FIG. 3B shows the size and the coordinates of the frame Fr printed on a material to be printed.

For example, the frame Fr is a frame printed beforehand on a material to be printed, such as a sheet, in which data such as a name or an address is to be filled in.

Focusing on the lines along the main scanning direction of the frame Fr (including the lines of the entry column on the material to be printed), the line having a larger coordinate in the sub-scanning direction (i.e., located above) is called a border line B1, and the line having a smaller coordinate (i.e., located below) is called a border line B2.

The distance Wh between the border lines B1 and B2 is indicated as Wh=W1-W2, where W1 denotes the coordinate of the border line B1 in the sub-scanning direction and W2 denotes the coordinate of the border line B2 in the sub-scanning direction.

Virtual print border lines M1 and M2 are provided inward from the border lines B1 and B2, respectively, by a predetermined distance so as to give a margin on both sides of the frame Fr in the sub-scanning direction.

The distance Ih of the print area A defined between the print border lines M1 and M2 in the sub-scanning direction is indicated as Ih=I1-I2, where I1 denotes the coordinate of the upper print border line M1 in the sub-scanning direction and I2 denotes the coordinate of the lower print border line M2 in the sub-scanning direction.

When considering the range corresponding to this distance Ih with the coordinates in the sub-scanning direction, the range may be called a printable height Ih.

The distance BL1 of the upper margin in the sub-scanning direction is indicated as W1-I1, and the distance BL2 of the lower margin in the sub-scanning direction is indicated as I2-W2.

These distances BL1 and BL2 of the margins in the sub-scanning direction may be set by default, or their ratio or the like may be set depending on the distance Wh of the frame Fr in the sub-scanning direction.

Alternatively, a user may input the margins prior to the printing.

The margins may be set at zero. In this case, the print area A is the area between the border lines B1 and B2.

FIG. 3C shows the size and the coordinates of print data.

The character string "ABC" shown in FIG. 3C is an example of print data of the graphics and characters (letters, symbols, marks and the like) to be printed by the printer 1.

The width set by the print data for the letters and images to be printed in the sub-scanning direction, i.e., the print width Ch is indicated as Ch=C1-C2, where C1 denotes the coordinate of the upper end of the print data in the sub-scanning direction and C2 denotes the coordinate of the lower end of the print data in the sub-scanning direction.

Next, the following describes various types of processing executed by the controller 30.

The following processing is performed when a user places the printer 1 on a material to be printed and scans the printer 1 over the material to be printed in the main scanning direction. The lowermost position in the sub-scanning direction recognized by the printer 1 is the lower end position of the line scanner 16 (image acquisition part 45).

Therefore in the following description, the coordinate S2 of the lower end of the line scanner 16 in the sub-scanning direction is used as the origin of the coordinate in the sub-scanning direction.

The controller 30 performs first determination processing, in which the controller determines based on an image acquired by the line scanner 16 whether the print width Ch of the print data is within the print area A (see FIG. 3B) or not.

Specifically when the user instructs the printer to start printing, and starts scanning with the printer 1 in the main scanning direction. Then the controller 30 performs detection processing on the image acquired by the line scanner 16 to detect the border lines B1 and B2 along the main scanning direction that are printed beforehand on the material to be printed.

Next, when the border lines B1 and B2 are detected, then the controller 30 performs area-setting processing, in which the upper print border line M1 and the lower print border line M2 are set in the area of the frame Fr defined by the border lines B1 and B2 so as to give margins. In this way the controller 30 sets the print area A.

Next, the controller 30 performs first determination processing whether the print width Ch of the print data is within the print area A of the material to be printed. This determination is based on whether the print width Ch is between the print border lines M1 and M2.

In such first determination processing, the controller determines that the print width Ch is within in the print area A of the material to be printed when the character string "ABC" to be printed is, as shown in FIG. 5A or FIG. 6A, printable within the print area A described referring to FIGS. 3A-3C (the area between coordinate I1 and coordinate I2). In this case, the character string may not be located at a center of the print area A in the sub-scanning direction.

Then, when the controller determines in the first determination processing that the print width Ch is within in the print area A of the material to be printed, the controller 30 performs processing to place the character string "ABC" to be printed at a center of the print area A in the sub-scanning direction.

Specifically when the controller 30 determines that the print width Ch is within the print area A of the material to be printed, the controller firstly performs first comparison processing. In this comparison processing, the controller compares a first distance IC1 between the upper end (coordinate C1) of the print width Ch and the upper print border line M1 (coordinate I1) and a second distance IC2 between the lower end (coordinate C2) of the print width Ch and the lower print border line M2 (coordinate I2).

In the first comparison processing, if the first distance IC1 is larger than the second distance IC2, then the character string "ABC" to be printed will be printed at a lower position of the print area A in the sub-scanning direction as shown in FIG. 5A. If the second distance IC2 is larger than the first distance IC1, then the character string "ABC" to be printed will be printed at an upper position of the print area A in the sub-scanning direction as shown in FIG. 6A.

Then, the controller 30 performs first print-width adjustment processing, in which the controller adjusts the print width Ch so that the character string "ABC" can be printed at a center of the print area A in the sub-scanning direction.

Specifically, in the first print-width adjustment processing, the controller 30 reduces the print width Ch so that the distance between the first distance IC1 and the second distance IC2 that is determined smaller in the first comparison processing can be equal to the distance determined larger as shown in FIGS. 5B and 6B.

For instance, in FIG. 5B, since the first distance IC1 is larger than the second distance IC2 as in FIG. 5A, the controller performs the first print-width adjustment processing so as to decrease the print width Ch until the second distance IC2 is equal to the first distance IC1.

Conversely, in FIG. 6B, since the second distance IC2 is larger than the first distance IC1 as in FIG. 6A, the controller performs the first print-width adjustment processing so as to decrease the print width Ch until the first distance IC1 is equal to the second distance IC2.

Figure 7A:
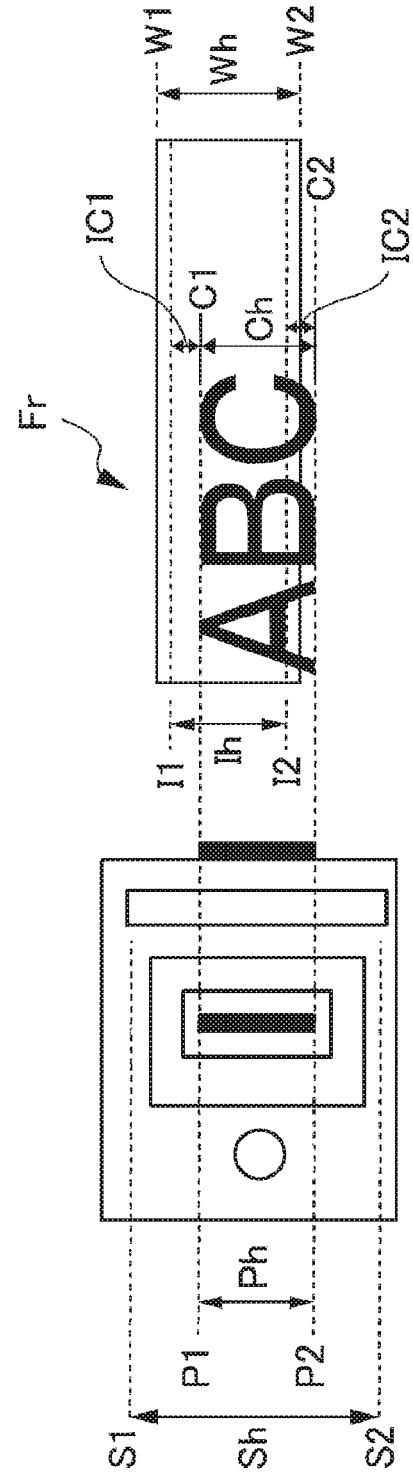
FIGS. 7A and 7B explain the adjustment of a print width of the first embodiment of the present invention.

On the contrary, the controller determines in the first determination processing that the print width Ch is not within the print area A of the material to be printed when the character string "ABC" to be printed is printed, as shown in FIG. 7A or FIG. 8A, beyond the print area A (the area between the coordinate I1 and the coordinate I2) described referring to FIGS. 3A-3C.

Figure 7B:
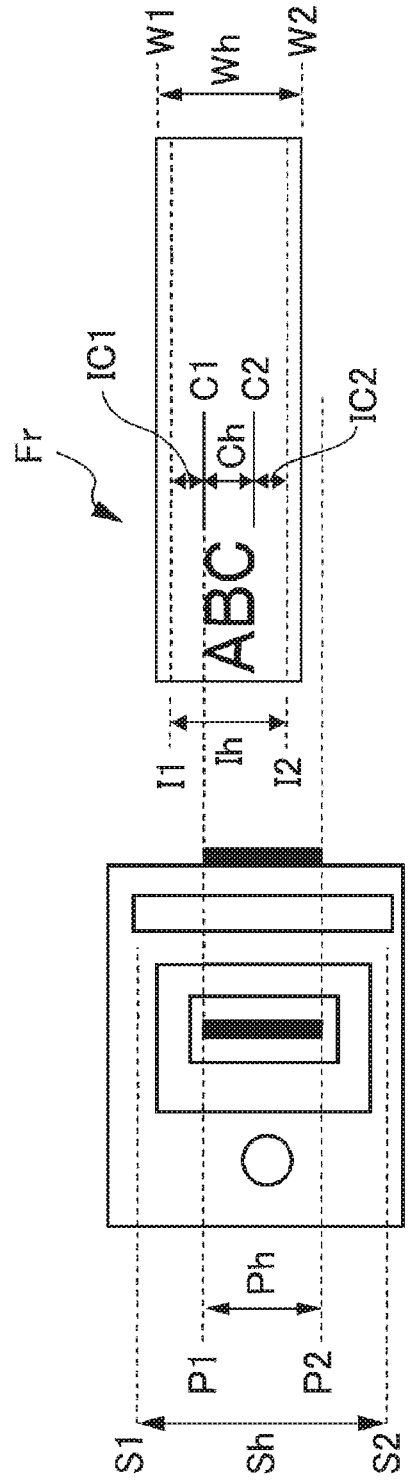

Then, when the controller determines in the first determination processing that the print width Ch is not within in the print area A of the material to be printed, the controller 30 performs second print-width adjustment processing. In this second print-width adjustment processing, as shown in FIGS. 7B and 8B, the controller reduces the print width Ch so that one of the upper end (coordinate C1) as one end of the print width Ch and the lower end (coordinate C2) as the other end that is not within the print border lines M1 (coordinate I1) and M2 (coordinate I2) is located within the print border lines M1 (coordinate I1) and M2 (coordinate I2).

In this second print-width adjustment processing, the controller adjusts the print width so that the character string "ABC" can be printed at a center of the print area A (the area between coordinate I1 and coordinate I2) in the sub-scanning direction.

Specifically when the upper end (coordinate C1) of the print width Ch is not between the print border lines M1 (coordinate I1) and M2 (coordinate I2) (i.e., when C1>I1) as shown in FIG. 8A, in the second print-width adjustment processing, the controller 30 reduces the print width Ch as shown in FIG. 8B so that the first distance IC1 between the upper end (coordinate C1) of the print width Ch and the upper print border line M1 (coordinate I1) is equal to the second distance IC2 between the lower end (coordinate C2) of the print width Ch and the lower print border line M2 (coordinate I2).

Note here that this processing is to let the upper end (coordinate C1) of the print width Ch within the print border lines M1 (coordinate I1) and M2 (coordinate I2). Therefore this processing assigns a coordinate below the print border line M1 (coordinate I1) where the first distance IC1 and the second distance IC2 have the same value relative to the print border line M1 (coordinate I1) to the upper end (coordinate C1) of the print width Ch.

Conversely when the lower end (coordinate C2) of the print width Ch is not between the print border lines M1 (coordinate I1) and M2 (coordinate I2) (i.e., when C2<I2) as shown in FIG. 7A, the controller 30 reduces the print width Ch as shown in FIG. 7B so that the second distance IC2 is equal to the first distance IC1.

Note here that this processing also is to let the lower end (coordinate C2) of the print width Ch within the print border lines M1 (coordinate I1) and M2 (coordinate I2). Therefore this processing assigns a coordinate above the print border line M2 (coordinate I2) where the second distance IC2 and the first distance IC1 have the same value relative to the print border line M2 (coordinate I2) to the lower end (coordinate C2) of the print width Ch.

Following the results of the first print-width adjustment processing or the second print-width adjustment processing, the controller 30 (particularly the print size calculation part 32) next calculates a print size (font) of the print data based on the print width Ch that is reduced in the first print-width adjustment processing or the second print-width adjustment processing.

Once the controller determines the print size (font), the print data of the print size (font) will be printed on the material to be printed. However, when the character string "ABC" to be printed with such a reduced print width Ch is printed at a center of the print area A (the area between the coordinate I1 and the coordinate I2) in the sub-scanning direction described referring to FIGS. 3A-3C, the print size (font) may be too small.

Then, when the calculated print size (font) is a preset minimum size or more, the controller 30 controls the print part 43 to print the data with the calculated size on the material to be printed when scanning in the main scanning direction proceeds until a detection result of the amount of movement by the move-amount detection part 44 (optical sensor 15) reaches a preset amount of movement (when the print head 14 reaches a position to start the printing).

On the contrary, if the calculated print size is less than the preset size, the controller 30 does not perform printing on the material to be printed, and outputs an error message to the user interface 18 (error output part).

The material to be printed may not have a frame Fr. Then when scanning in the main scanning direction proceeds until a detection result of the amount of movement by the move-amount detection part 44 (optical sensor 15) reaches a preset amount of movement (when the print head 14 reaches a position to start the printing), no upper border line B1 (see FIG. 3B) and lower border line B2 (see FIG. 3B) may be detected from the image acquired by the image acquisition part 45 (line scanner 16). In that case, the controller 30 controls the print part 43 to start printing on the material to be printed in accordance with the print data set beforehand.

When a sufficient large frame Fr is printed, for example, such a frame Fr may not be detected. In this case also, the controller 30 controls the print part 43 to start printing on the material to be printed in accordance with the print data set beforehand.

When such a sufficient large frame Fr is printed, data will be less likely printed beyond the frame Fr. Centering of data in such a frame Fr also is not frequently performed. Therefore printing can be performed on the material to be printed in accordance with the print data set beforehand without problems in that case.

[Operation of Printer]

Figure 4A:
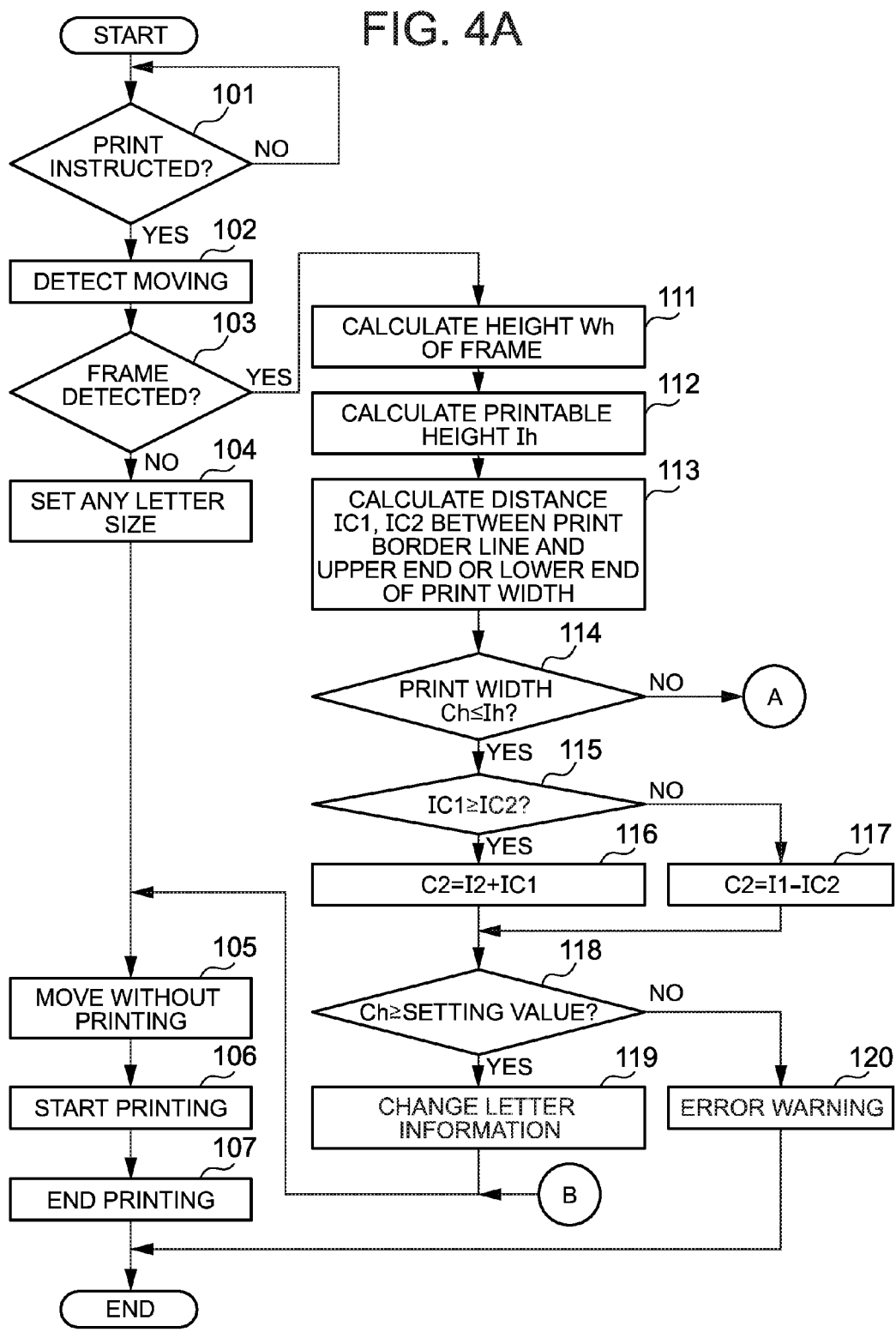
FIG. 4A is a flowchart showing a part of the operation of the printer according to the first embodiment of the present invention.

The above describes the basic processing by the printer, and the following describes the operation of the printer 1 again in details, with reference to the flowcharts of FIG. 4A and FIG. 4B showing the operation of the printer 1.

Note here that, prior to the operation of the flowchart of FIG. 4A, the printer 1 reads print data through the communication interface 47, and stores the print data in the RAM 42 as print buffer in association with the amount of movement.

Therefore, the printer becomes ready for printing when the contents of the print buffer are sequentially transferred to the print head 14 in accordance with the amount of movement detected by the optical sensor 15 (move-amount detection part 44).

The following describes the operation of the printer 1 in details.

When a user turns on the power-source button 20, the printer 1 is activated. At Step 101, the controller 30 starts loop processing to determine whether the print instruction button 19 is operated or not until the user operates the print instruction button 19.

When the user sets the print start position marker 17 of the printer 1 at the print start position and operates the print instruction button 19, the procedure shifts to the processing of Step 102 or later.

At Step 102, the controller 30 controls the optical sensor 15 (move-amount detection part 44) to start the detection of the amount of movement of the printer 1 in the main scanning direction.

When detecting the starting of moving based on the detection of the amount of movement, at Step 103, the controller 30 determines whether a frame Fr is detected or not based on a result of an image detection processing by the line scanner 16 (image acquisition part 45).

That is, the controller determines whether any parallel lines corresponding to the border lines B1 and B2 as stated above for the detection processing to detect the border lines B1 and B2 are detected or not.

When the material to be printed has a frame Fr, the user will place the printer 1 around the frame Fr. Therefore such a frame Fr will be detected soon after the printer 1 starts to move. That is, this determination is performed soon after the controller detects the starting of the printer based on the detected amount of movement.

When the controller determines at Step 103 that a frame Fr is detected, the controller 30 performs the processing of Step 111 or later. When the controller determines that no frame Fr is detected, the controller 30 performs the processing of Step 104 or later.

When the procedure shifts to Step 104, since no frame Fr is detected, the controller 30 controls the print part 43 to start printing on the material to be printed in accordance with the print data set beforehand.

Specifically, at Step 104, the controller 30 sets any print size that is designated beforehand.

At Step 105, the controller 30 waits for the printer moving forward by the distance between the print head 14 and the print start position marker 17 without printing by the print head 14. After this step ends, at Step 106, the controller 30 controls the print head 14 as the print part 43 to start printing with the size of letters set at Step 104. Then at Step 107, the controller 30 confirms the ending of the printing (e.g., confirms that all of the print buffer is printed), and ends a series of the printing procedure.

On the contrary, when the procedure shifts to Step 111 from Step 103, parallel lines (border lines B1 and B2) along the main scanning direction are detected at the detecting processing based on the image acquired by the line scanner 16 (image acquisition part 45). Therefore at Step 111, the controller 30 calculates the distance Wh (this may be refers to as height Wh) in the sub-scanning direction of the detected frame Fr.

Next, at Step 112, the controller 30 calculates the printable height Ih considering margins for the height Wh of the frame Fr. That is, the controller sets the print border lines M1 and M2 considering the margins for the height Wh of the frame Fr, and thus performs area-setting processing to set a print area A.

Setting the print border lines M1 and M2 means setting the coordinate I1 of the print border line M1 and the coordinate I2 of the print border line M2 in the sub-scanning direction.

Next, at Step 113, the controller 30 calculates the distance between the print border line M1 and the upper end of the print width Ch and the distance between the print border line M2 and the lower end of the print width Ch (the first distance IC1 and the second distance IC2).

That is, the controller calculates the first distance IC1 between the print border line M1 (coordinate I1) and the upper end (coordinate C1) of the print width Ch and the second distance IC2 between the print border line M2 (coordinate I2) and the lower end (coordinate C2) of the print width Ch.

At Step 114, the controller 30 performs the first comparison processing to determine whether the print width Ch of the print data is lower than the printable height Ih.

Specifically as described above, the controller 30 compares the coordinate I1 of the upper print border line M1 and the coordinate C1 of the upper end of the print width Ch and compares the coordinate I2 of the lower print border line M2 and the coordinate C2 of the lower end of the print width, and if I1≥C1 and C2≥I2 (see FIG. 5A and FIG. 6A), the controller determines that the print width Ch of the print data is within the printable height Ih. Then, the procedure shifts to Step 115.

Conversely, if this is not the case of I1≥C1 and C2≥I2 (see FIG. 7A and FIG. 8A), the controller determines that the print width Ch of the print data is not within the printable height Ih. Then, the procedure shifts to Step 121 (see FIG. 4B).

As a result of the determination at Step 114 of FIG. 4A, when the procedure shifts to Step 115, the controller 30 compares the first distance IC1 between the upper print border line M1 and the upper end of the print width Ch and the second distance IC2 between the lower print border line M2 and the lower end of the print width Ch.

When the result of comparison shows that the first distance IC1 is the second distance IC2 or more as shown in FIG. 5A, at Step 116, the controller 30 performs the first print-width adjustment processing. In this processing, the controller assigns the value obtained by adding the first distance IC1 to the coordinate I2 of the lower print border line M2 to the coordinate C2 of the lower end of the print width Ch and thus reduces the print width Ch so that the second distance IC2 is equal to the first distance IC1 as shown in FIG. 5B.

Such a reduced print width Ch results in the print width Ch located at a center of the print area A in the sub-scanning direction (center between the print border lines M1 and M2 in the sub-scanning direction), so that the print data can be printed at a center of the print area A in the sub-scanning direction.

On the other hand, when the result of comparison at Step 115 shows that the first distance IC1 is less than the second distance IC2 as shown in FIG. 6A, at Step 117, the controller 30 performs the first print-width adjustment processing. In this processing, the controller assigns the value obtained by subtracting the second distance IC2 from the coordinate I1 of the upper print border line M1 to the coordinate C1 of the upper end of the print width Ch and thus reduces the print width Ch so that the first distance IC1 is equal to the second distance IC2 as shown in FIG. 6B.

Such a reduced print width Ch results in the print width Ch located at a center of the print area A in the sub-scanning direction (center between the print border lines M1 and M2 in the sub-scanning direction), so that the print data can be printed at a center of the print area A in the sub-scanning direction.

After Step 116 or Step 117 as stated above, the procedure shifts to Step 118.

At this Step 118, the controller 30 determines whether the print width Ch based on the coordinates (coordinate C1 of the upper end and coordinate C2 of the lower end) changed at Step 116 or Step 117 is a setting value or more.

That is, the controller obtains the print width Ch specifically from the coordinates of the changed print width Ch (coordinate C1 of the upper end and coordinate C2 of the lower end) and calculates the print size (font of graphics and characters to be printed) such that the print data can be printed within the print width Ch. Then the controller determines whether such a print size (font) is a preset size (font) as a minimum value or more.

Then when the print size (font) is the preset size (font) as a minimum value or more, the procedure shifts to Step 119. At Step 119, the controller 30 performs letter-information changing processing. In this processing, the controller sets the coordinates for the print head 14 to print the print data of the calculated printed size (font).

After that, at Step 105, the controller 30 waits for the printer moving forward by a predetermined distance similarly to the above, and executes print starting and print ending at Step 106 and Step 107, respectively.

If such adjustment is not performed, the data will be printed at an upper part or a lower part of the print area A as illustrated in FIG. 5A and FIG. 6A. Instead, as a result of the above processing, the printed data can be located at the center of the print area A in the sub-scanning direction favorably as shown in FIG. 5B and FIG. 6B.

On the other hand, if the print width Ch based on the coordinates (coordinate C1 of the upper end and coordinate C2 of the lower end) changed at Step 116 or Step 117 is less than the setting value, i.e., if the calculated print size (font) is less than the preset size (font) as a minimum value, at Step 120, the controller 30 controls the error output part to output an error message for error warning, and ends the procedure without printing.

Next, referring to FIG. 4B, the following describes the case where the determination at Step 114 results in that the print width Ch of the print data is not within the printable height Ih and the procedure shifts to Step 121.

At this Step 121, the controller 30 determines whether the coordinate I2 of the lower print border line M2 is located above the coordinate C2 of the lower end of the print width Ch.

That is, the controller determines whether the data is printed downward beyond the print area A or not.

When the result of comparison shows that the coordinate I2 is the coordinate C2 or more as shown in FIG. 7A, at Step 122, the controller 30 performs the second print-width adjustment processing. In this processing, the controller assigns the value obtained by adding the first distance IC1 to the coordinate I2 of the lower print border line M2 to the coordinate C2 of the lower end of the print width Ch and thus reduces the print width Ch so that the coordinate C2 of the lower end of the print width Ch is located between the print border line M1 (coordinate I1) and the print border line M2 (coordinate I2) and the second distance IC2 is equal to the first distance IC1 as shown in FIG. 7B.

Such a reduced print width Ch results in the print width Ch located at a center of the print area A in the sub-scanning direction (center between the print border lines M1 and M2 in the sub-scanning direction), so that the print data can be printed at a center of the print area A in the sub-scanning direction.

On the contrary, when the procedure shifts to Step 121, the data without adjustment will be printed beyond the print area A. If the result of the comparison at Step 121 shows that the coordinate I2 is less than the coordinate C2, the data without adjustment will be printed beyond the print area in the opposite direction to the above, i.e., the data will be printed upward beyond the print area A as shown in FIG. 8A.

Then, at Step 123, the controller 30 performs the second print-width adjustment processing. In this processing, the controller assigns the value obtained by subtracting the second distance IC2 from the coordinate I1 of the upper print border line M1 to the coordinate C1 of the upper end of the print width Ch and thus reduces the print width Ch so that the coordinate C1 of the upper end of the print width Ch is located between the print border line M1 (coordinate I1) and the print border line M2 (coordinate I2) and the second distance IC2 is equal to the first distance IC1 as shown in FIG. 8B.

Such a reduced print width Ch results in the print width Ch located at a center of the print area A in the sub-scanning direction (center between the print border lines M1 and M2 in the sub-scanning direction), so that the print data can be printed at a center of the print area A in the sub-scanning direction.

After Step 122 or Step 123 as stated above, the procedure shifts to Step 124.

When the procedure shifts to Step 124, the situation is exactly the same as that the procedure shifting to Step 118 as stated above.

Therefore a similar determination to Step 118 is performed at Step 124. As a result of the determination, if the procedure shifts to Step 125, a similar determination to Step 119 is performed at Step 125. Subsequently, the procedure shifts to Steps, 105, 106 and 107, and after that, the printing ends.

If such adjustment is not performed, the data will be printed at an upper part or a lower part of the print area A as illustrated in FIG. 7A and FIG. 8A. Instead, as a result of the above processing, the printed data can be located at the center of the print area A in the sub-scanning direction favorably as shown in FIG. 7B and FIG. 8B.

When the procedure shifts to Step 126, error processing similar to Step 120 is executed.

Note here that when the controller determines at Step 103 as the detection of a frame Fr, and when three or lines in the main scanning direction are detected as shown in FIG. 9A, for example, the controller considers the two lines closer to the center coordinate of the print head 14 in the sub-scanning direction, i.e., the coordinate represented by (P1+P2)/2 as the lines of the frame Fr in the main scanning direction. Then the controller may execute similar processing to that described referring to FIGS. 4A and 4B.

Then the data can be printed as in FIG. 9B, although if any adjustment is not performed, the data will be printed as in FIG. 9A. In this way, the data can be printed with good appearance at an appropriate position on the material to be printed having an entry column as a table shown in FIGS. 9A and 9B.

That is the description on the first embodiment. For instance, if the first determination processing shows that the print width Ch of the print data is not within the print area A of the material to be printed, the controller controls to output an error message so as to encourage the user to set the printer 1 again on the material to be printed.

In the above description on the first embodiment, the area having margins in the frame Fr printed on the material to be printed, i.e., the area between the upper and lower print border lines M1 and M2 is set as the print area A.

Instead, as mentioned above, the area between one border line B1 and the other border line B2 indicating the upper and lower positions of the frame Fr printed on the material to be printed may be set as the print area A.

In the above description on the first embodiment, the ink cartridge 13 having the print head 14 is fixed to the printer 1.

Instead, the ink cartridge 13 may be configured slidable for a predetermined width in the sub-scanning direction.

For instance, the printer may include an attachment part to which the ink cartridge 13 can be attached, in which the ink cartridge is controlled slidably by a steeping motor along a LM guide as the sliding axis.

When the ink cartridge 13 is slidable in the sub-scanning direction in this way, if the user moves the printer 1 obliquely to the border lines B1 and B2, such a state of the printer 1 having the main scanning direction not along the border lines B1 and B2 can be detected from the image acquired by the image acquisition part 45 (line scanner 16). Then the printer may be controlled to slide the ink cartridge 13 while correcting such an oblique state, thereby preventing the printing of print data obliquely to the frame Fr (i.e., upward to the right or downward to the right).

Instead of correcting the oblique movement of the printer 1 by the user relative to the border lines B1 and B2 by sliding the ink cartridge 13 as stated above, the coordinates of the print data may be corrected depending on the oblique degree of the print data relative to the frame Fr so as to decrease the oblique of the print data relative to the frame Fr.

The above description on the first embodiment exemplifies the case where the data is printed at the vertical center of the border lines B1 and B2. The data, however, is not necessarily required to be located at the vertical center of the border lines B1 and B2.

For instance, when letters are printed along lines on a notebook, the letters will be more easily read when they are printed slightly downward from the middle between the lines.

Therefore the print position is not always at the vertical center of the border lines B1 and B2.

Several methods can be used to implement such printing. In one example, in the area-setting processing at Step 112 of FIG. 4A while referring to FIGS. 3A-3C, in which the upper print border line M1 and the lower print border line M2 are set in the area within the frame Fr so as to have margins from the border lines B1 and B2, the margin from the border line B2 may be set smaller than the margin from the border line B1. That is, the lower print border line M2 may be set closer to the border line B2. Thereby, the data will be printed closer to the border line B2 than to the border line B1 even when the same procedure as stated above is used. In this way, data can be printed slightly downward from the middle between the lines on the notebook.

Second Embodiment

The first embodiment describes the specific example where a frame Fr is printed on the material to be printed such as a sheet. A material to be printed may have an underline UL printed not a frame FR, and the following describes such a case of a material to be printed having an under line UL.

The configuration of the printer 1 in the second embodiment is similar to that of the first embodiment, and the processing is different only in that data is printed on a material to be printed having an underline UL. Therefore the descriptions on the overall configuration of the printer 1 are omitted.

[Processing Executed by Controller]

Prior to the specific description of the processing executed by the controller 30 according to the second embodiment, the following firstly describes the underline UL printed on a material to be printed, followed by various types of processing executed by the controller 30.

Figure 10:
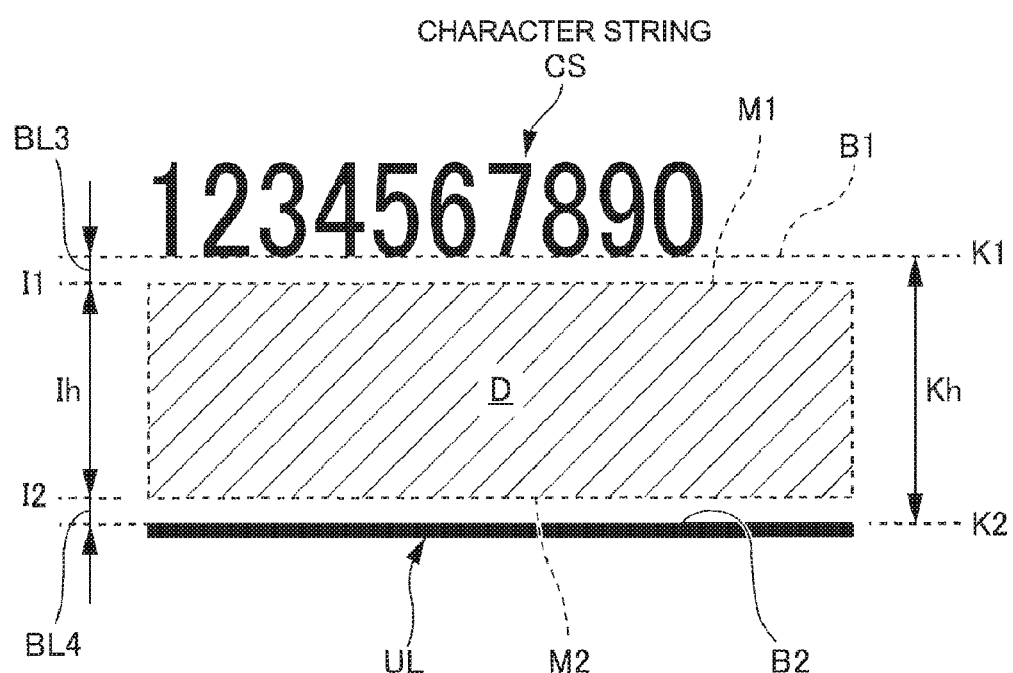
FIG. 10 explains the size and the coordinates in a second embodiment of the present invention, showing an underline and a character string printed on a material to be printed.

FIG. 10 shows the size and the coordinates of a print area D that are determined based on the underline UL printed beforehand on a material to be printed and a character string CS.

For example, the underline UL is printed on a material to be printed, such as a sheet, and shows the lower border line of an entry area in which data such as a name or an address is to be filled in.

When a character string CS along the main scanning direction is present above the underline UL, the area between the character string CS and the underline UL is the entry area (this may be called underline area).

When the print area D is determined based on such underline UL and character string CS, a virtual line along the lower end of the character string CS is set as the upper border line B1, and the upper end of the underline UL is set as the border line B2.

The distance Kh between the border lines B1 and B2 is indicated as Kh=K1-K2, where K1 denotes the coordinate of the border line B1 in the sub-scanning direction and K2 denotes the coordinate of the border line B2 in the sub-scanning direction.

Virtual print border lines M1 and M2 are provided inward from the border lines B1 and B2, respectively, by a predetermined distance so as to give a margin on both sides of the area between the character string CS and the underline UL in the sub-scanning direction.

The distance Ih of the print area D defined between the print border lines M1 and M2 in the sub-scanning direction is indicated as Ih=I1-I2, where I1 denotes the coordinate of the upper print border line M1 in the sub-scanning direction and I2 denotes the coordinate of the lower print border line M2 in the sub-scanning direction.

When considering the range corresponding to this distance Ih with the coordinates in the sub-scanning direction, the range may be called a printable height Ih.

The distance BL3 of the upper margin in the sub-scanning direction is indicated as K1-I1, and the distance BL4 of the lower margin in the sub-scanning direction is indicated as I2-K2.

These distances BL3 and BL4 of the margins in the sub-scanning direction may be set by default, or their ratio or the like may be set depending on the distance Kh.

Alternatively, a user may input the margins prior to the printing.

The margins may be set at zero. In this case, the print area d is the area between the border lines B1 and B2.

Next, the following describes various types of processing executed by the controller 30 of the second embodiment.

The following processing is performed when a user places the printer 1 on a material to be printed and scans the printer 1 over the material to be printed in the main scanning direction. The lowermost position in the sub-scanning direction recognized by the printer 1 is the lower end position of the line scanner 16 (image acquisition part 45).

Therefore in the following description, the coordinate S2 of the lower end of the line scanner 16 in the sub-scanning direction is used as the origin of the coordinate in the sub-scanning direction.

The controller 30 performs first determination processing, in which the controller determines based on an image acquired by the line scanner 16 whether the print width Ch of the print data is within the print area D (see FIG. 10) on the material to be printed or not. The print width Ch is the width of letters and images in the sub-scanning direction that is set depending on the print data.

Specifically when the user instructs the printer to start printing, and starts scanning with the printer 1 in the main scanning direction. Then the controller 30 performs first border-line determination processing, in which the controller sets the lower end of the character string CS in the main scanning direction that is printed beforehand on the material to be printed as an upper border line B1 (a first border line) based on the image acquired by the line scanner 16. Then the controller performs detection processing to detect the upper end of the underline UL as the lower border line B2 (a second border line).

Next, when the border lines B1 and B2 are detected, then the controller 30 performs area-setting processing, in which the upper print border line M1 and the lower print border line M2 are set so as to give margins from these border lines B1 and B2. In this way the controller 30 sets the print area D.

Next, the controller 30 performs first determination processing whether the print width Ch of the print data is within the print area D of the material to be printed. This determination is based on whether the print width Ch is between the print border lines M1 and M2.

In such first determination processing, the controller determines that the print width Ch is within in the print area D of the material to be printed when the character string "ABC" to be printed is, as shown in FIG. 12 or FIG. 13A, printable within the print area D described referring to FIG. 10 (the area between coordinate I1 and coordinate I2). In this case, the character string may not be located at a center of the print area D in the sub-scanning direction.

Then, when the controller determines in the first determination processing that the print width Ch is within in the print area D of the material to be printed, the controller 30 performs processing to place the character string "ABC" to be printed at a center or at a lower position of the print area D in the sub-scanning direction for better appearance.

Specifically when the controller 30 determines that the print width Ch is within the print area D of the material to be printed, the controller firstly performs first comparison processing. In this comparison processing, the controller compares a first distance IC1 between the upper end (coordinate C1) of the print width Ch and the upper print border line M1 (coordinate I1) and a second distance IC2 between the lower end (coordinate C2) of the print width Ch and the lower print border line M2 (coordinate I2).

In the first comparison processing, if the first distance IC1 is larger than the second distance IC2, then the character string "ABC" to be printed will be printed at a lower position of the print area D in the sub-scanning direction as shown in FIG. 12. If the second distance IC2 is larger than the first distance IC1, then the character string "ABC" to be printed will be printed at an upper position of the print area D in the sub-scanning direction as shown in FIG. 13A.

Then, if the second distance IC2 is larger than the first distance IC1 as shown in FIG. 13A, the controller 30 performs first print-width adjustment processing, in which the controller adjusts the print width Ch so that the character string "ABC" can be printed at a center of the print area D in the sub-scanning direction.

Specifically, if the first distance IC1 is smaller than the second distance IC2 at the first comparison processing as shown in FIG. 13B, the controller 30 reduces the print width Ch in the first print-width adjustment processing so that the first distance IC1 is equal to the second distance IC2.

In this way, when the print width Ch is reduced so that the first distance IC1 is equal to the second distance IC2, then the character string "ABC" will be printed at a center of the print area D as shown in FIG. 13B instead of printed at an upper position of the print area D as in FIG. 13A.

On the contrary, when the character string "ABC" to be printed is printed at a lower position of the print area D in the sub-scanning direction as shown in FIG. 12, i.e., the character string "ABC" is printed closer to the underline UL, such a printed result seems to be normal. Therefore the character string in that case is printed without adjusting the print width Ch in this embodiment.

Figure 15A:
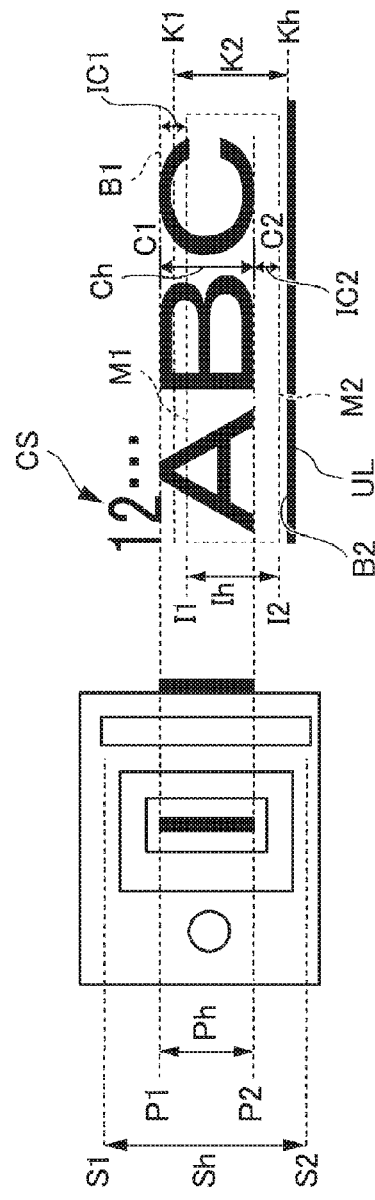
FIGS. 15A and 15B explain the adjustment of a print width of the second embodiment of the present invention.

On the contrary, the controller determines in the first determination processing that the print width Ch is not within the print area D of the material to be printed when the character string "ABC" to be printed is printed, as shown in FIG. 14A or FIG. 15A, beyond the print area D (the area between the coordinate I1 and the coordinate I2) described referring to FIG. 10.

Then, when the controller determines in the first determination processing that the print width Ch is not within in the print area D of the material to be printed, the controller 30 performs second print-width adjustment processing. In this second print-width adjustment processing, as shown in FIGS. 14B and 15B, the controller reduces the print width Ch so that one of the upper end (coordinate C1) as one end of the print width Ch and the lower end (coordinate C2) as the other end that is not within the print border lines M1 (coordinate I1) and M2 (coordinate I2) is located within the print border lines M1 (coordinate I1) and M2 (coordinate I2), and so that the character string "ABC" can be printed in the print area D.

In this second print-width adjustment processing, the controller adjusts the print width so that the character string "ABC" can be printed with good appearance and so that the character string "ABC" can be printed at a center or at a lower position of the print area D (the area between coordinate I1 and coordinate I2) in the sub-scanning direction.

Figure 15B:
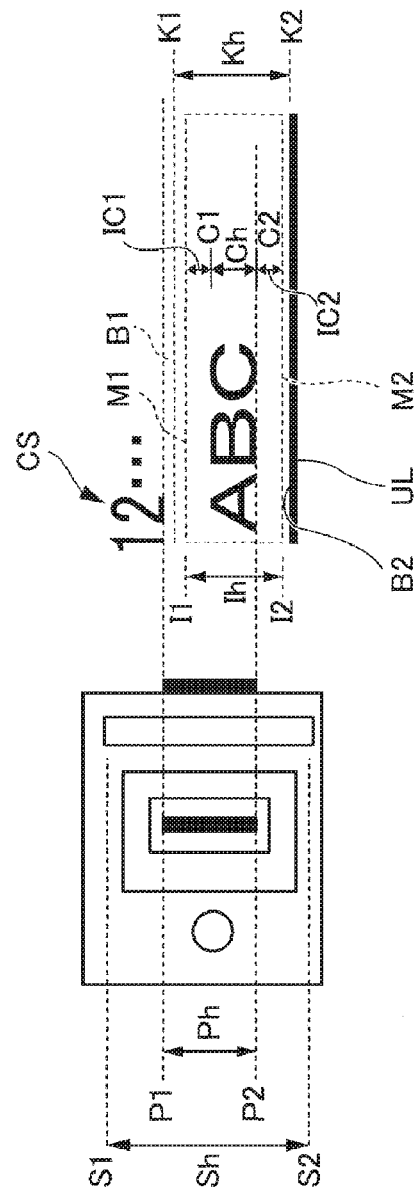

Specifically when the upper end (coordinate C1) of the print width Ch is not between the print border lines M1 (coordinate I1) and M2 (coordinate I2) (i.e., when C1>I1) as shown in FIG. 15A, in the second print-width adjustment processing, the controller 30 reduces the print width Ch as shown in FIG. 15B so that the first distance IC1 between the upper end (coordinate C1) of the print width Ch and the upper print border line M1 (coordinate I1) is equal to the second distance IC2 between the lower end (coordinate C2) of the print width Ch and the lower print border line M2 (coordinate I2) and so that the character string "ABC" can be printed at the center of the print area D.

Note here that this processing is to let the upper end (coordinate C1) of the print width Ch within the print border lines M1 (coordinate I1) and M2 (coordinate I2). Therefore this processing assigns a coordinate below the print border line M1 (coordinate I1) where the first distance IC1 and the second distance IC2 have the same value relative to the print border line M1 (coordinate I1) to the upper end (coordinate C1) of the print width Ch.

Conversely when the lower end (coordinate C2) of the print width Ch is not between the print border lines M1 (coordinate I1) and M2 (coordinate I2) (i.e., when C2<I2) as shown in FIG. 14A, the controller 30 reduces the print width Ch as shown in FIG. 14B so that the second distance IC2 is equal to the first distance IC1, and so that the character string "ABC" can be printed at a lower position of the print area D.

In this processing, the lower end (coordinate C2) of the print width Ch, which is downward beyond the print area D before adjustment, is adjusted to be located at the print border line M2 (coordinate I2), and therefore the character string "ABC" will be naturally printed within the print area D and be printed at a lower position of the print area D.

Following the results of the first print-width adjustment processing or the second print-width adjustment processing, the controller 30 (particularly the print size calculation part 32) next calculates a print size (font) of the print data for actually printing based on the print width Ch that is reduced in the first print-width adjustment processing or the second print-width adjustment processing.

Once the controller determines the print size (font), the print data of the print size (font) will be printed on the material to be printed. However, when the character string "ABC" to be printed with such a reduced print width Ch is printed at a center of the print area D (the area between the coordinate I1 and the coordinate I2) in the sub-scanning direction described referring to FIG. 10, the print size (font) may be too small.

Then, when the calculated print size (font) is a preset minimum size or more, the controller 30 controls the print part 43 to print the data with the calculated size on the material to be printed when scanning in the main scanning direction proceeds until a detection result of the amount of movement by the move-amount detection part 44 (optical sensor 15) reaches a preset amount of movement (when the print head 14 reaches a position to start the printing).

On the contrary, if the calculated print size is less than the preset size, the controller 30 does not perform printing on the material to be printed, and outputs an error message to the user interface 18 (error output part).

The material to be printed may not have a character string CS above the underline UL.

In such a case, the controller 30 performs first border line determination processing to set the coordinate P1 of the upper end of the print head 14 in the sub-scanning direction as the upper border line B1 (a first border line), and in the area-setting processing to set the print area D, the controller sets such an upper border line B1 as the upper print border line M1 (coordinate I1) of the print area D.

Detection of the lower border line B2 and setting of the lower print border line M2 (coordinate I2) are performed similarly to the above.

Next, the controller 30 performs first determination processing whether the print width Ch of the print data is within the print area D of the material to be printed. This determination is based on whether the print width Ch is between the print border lines M1 and M2.

In this case, the print border line M1 is based on the coordinate P1 of the upper end of the print head 14 in the sub-scanning direction, and therefore the print width Ch is not upward beyond the print area D. Therefore, the first determination processing to determine whether the print width Ch is within the print area D of the material to be printed is performed to check whether the print width Ch is not located downward beyond the print area D.

Figure 17:
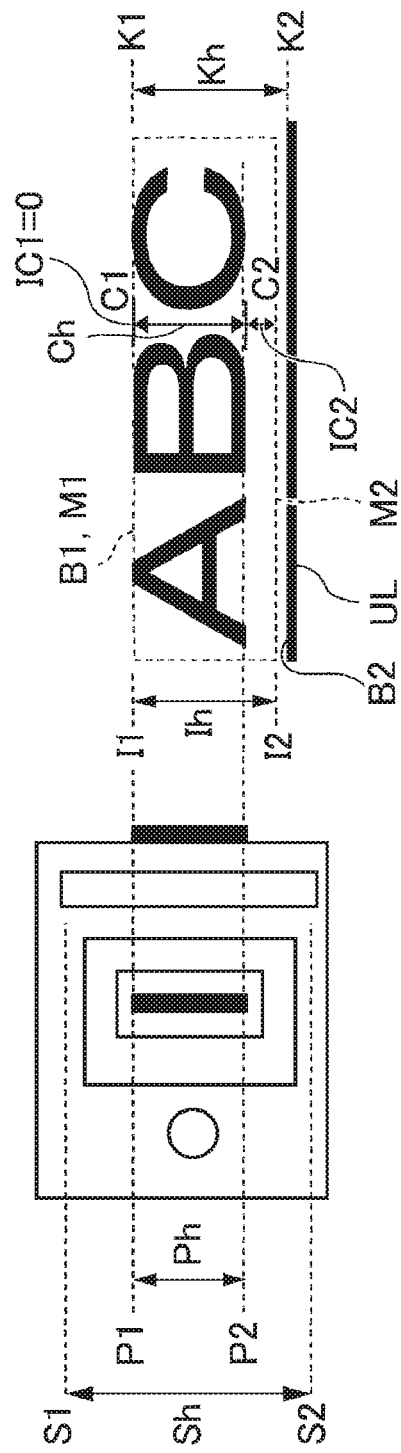
FIG. 17 explains the adjustment of a print width of the second embodiment of the present invention, showing the case where data is printed within a print area without adjusting the print width.

The controller determines that the print width Ch is within in the print area D of the material to be printed when the character string "ABC" to be printed is, as shown in FIG. 17, printable within the print area D. When the controller determines as such, printing is performed without adjusting the print width.

Figure 16A:
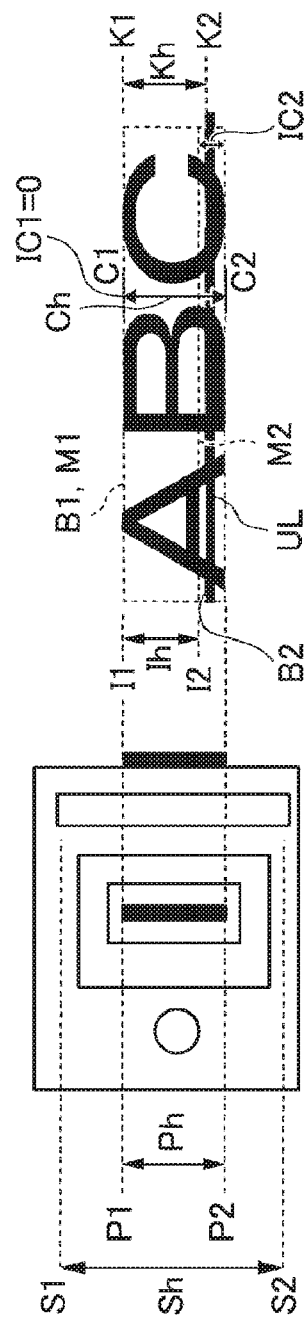
FIGS. 16A and 16B explain the adjustment of a print width of the second embodiment of the present invention.
Figure 16B:
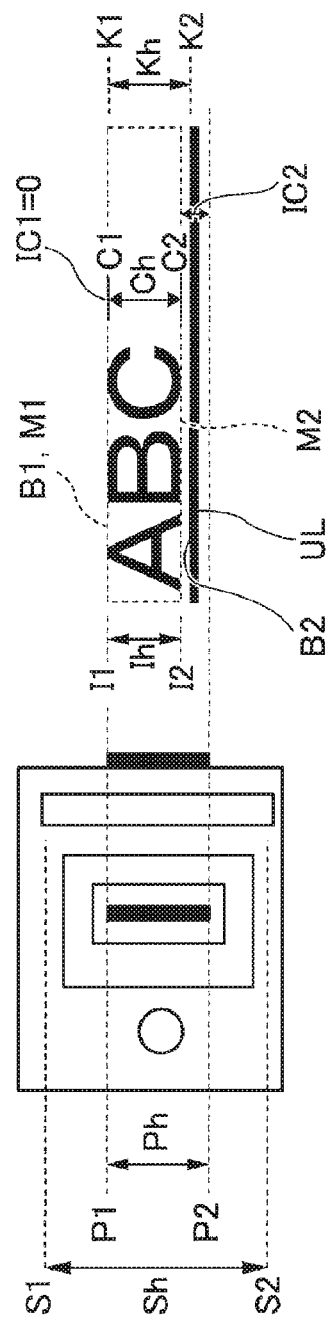

On the contrary, the controller determines that the print width Ch is not within in the print area D of the material to be printed when the character string "ABC" is, as shown in FIG. 16A, printed downward across the lower print border line M2 (coordinate I2) of the print area D. When the controller determines as such, the controller performs the second print-width adjustment processing so that the lower end (coordinate C2) of the print width Ch is located at the lower print border line M2 (coordinate I2) of the print area D as shown in FIG. 16B.

The material to be printed may not have an underline UL.

Then when scanning in the main scanning direction proceeds until a detection result of the amount of movement by the move-amount detection part 44 (optical sensor 15) reaches a preset amount of movement (when the print head 14 reaches a position to start the printing), no lower border line B2 (see FIG. 10) may be detected from the image acquired by the image acquisition part 45 (line scanner 16). In that case, the controller 30 controls the print part 43 to start printing on the material to be printed in accordance with the print data set beforehand.

[Operation of Printer]

Figure 11A:
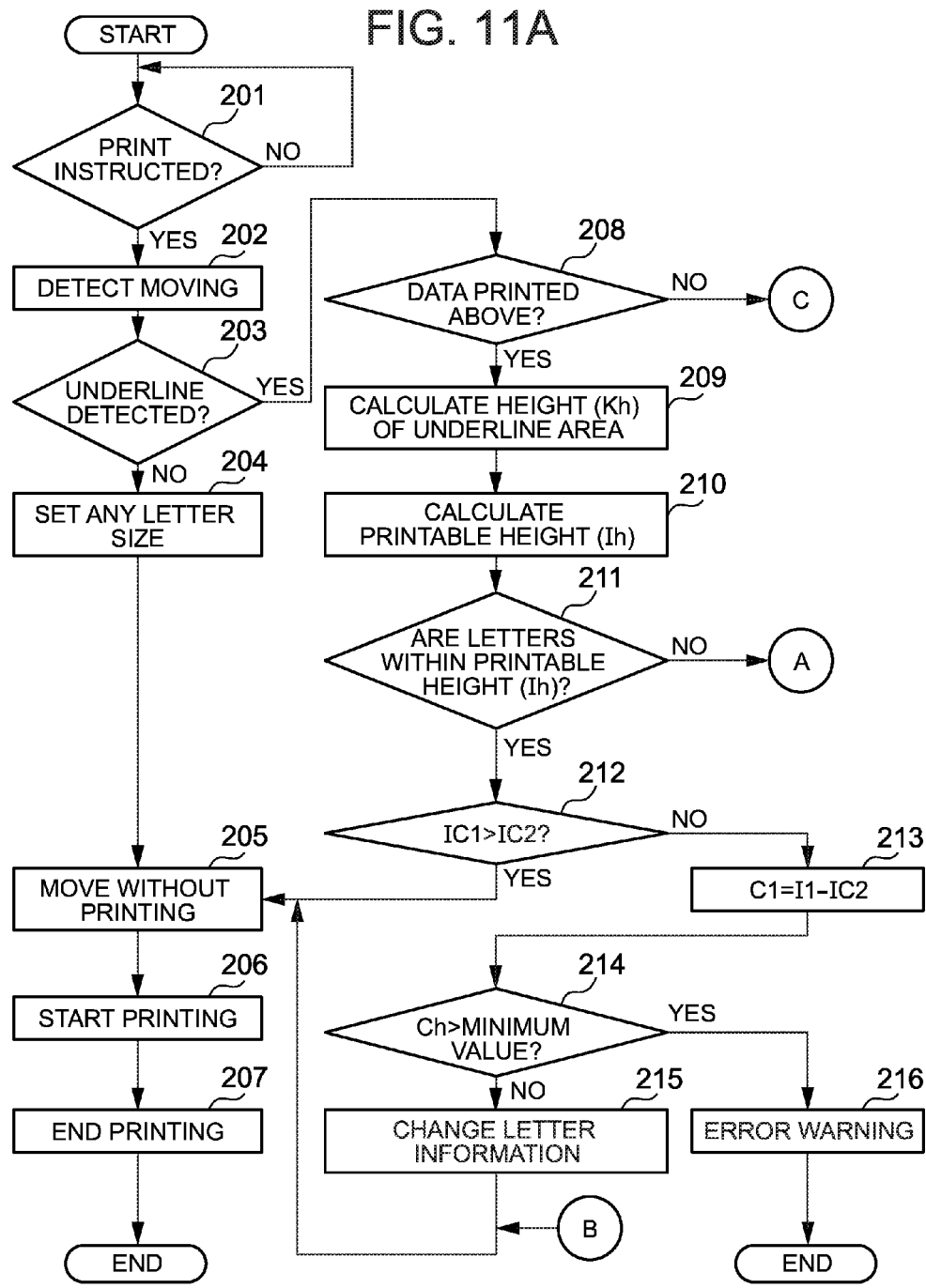
FIG. 11A is a flowchart showing a part of the operation of the printer according to the second embodiment of the present invention.
Figure 11B:
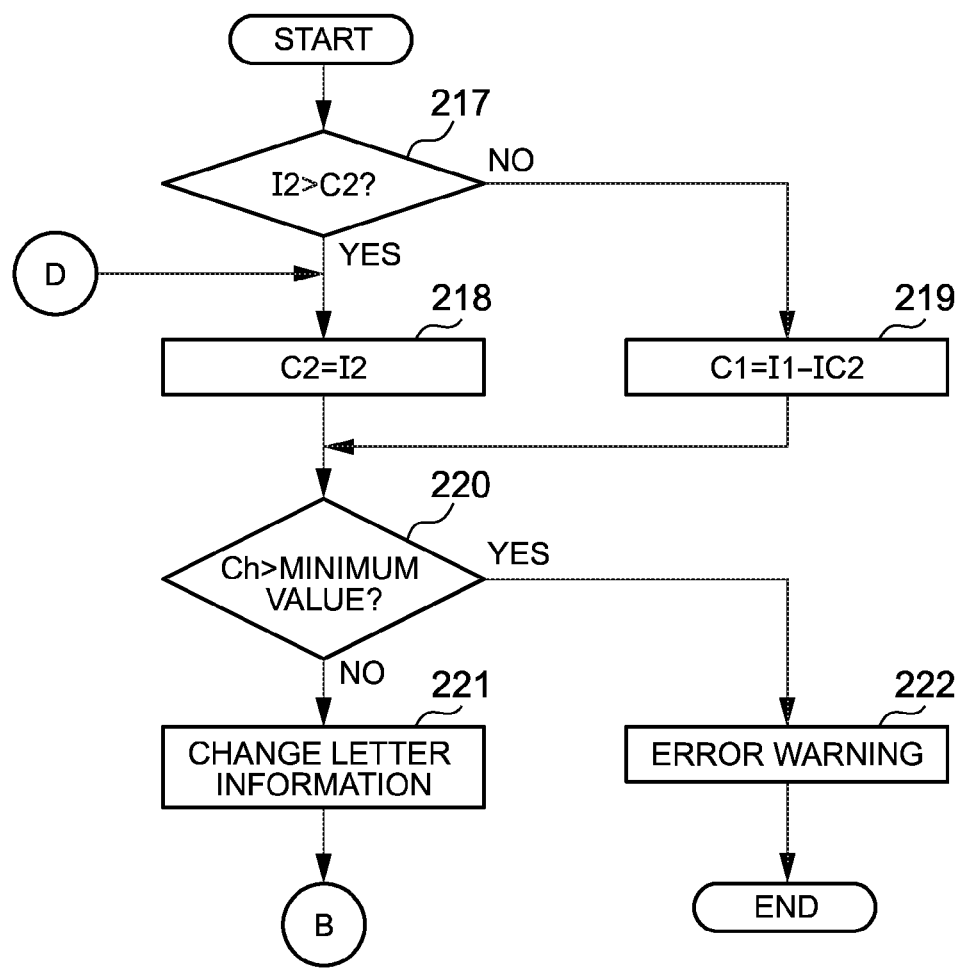
FIG. 11B is a flowchart showing a part of the operation of the printer according to the second embodiment of the present invention.
Figure 11C:
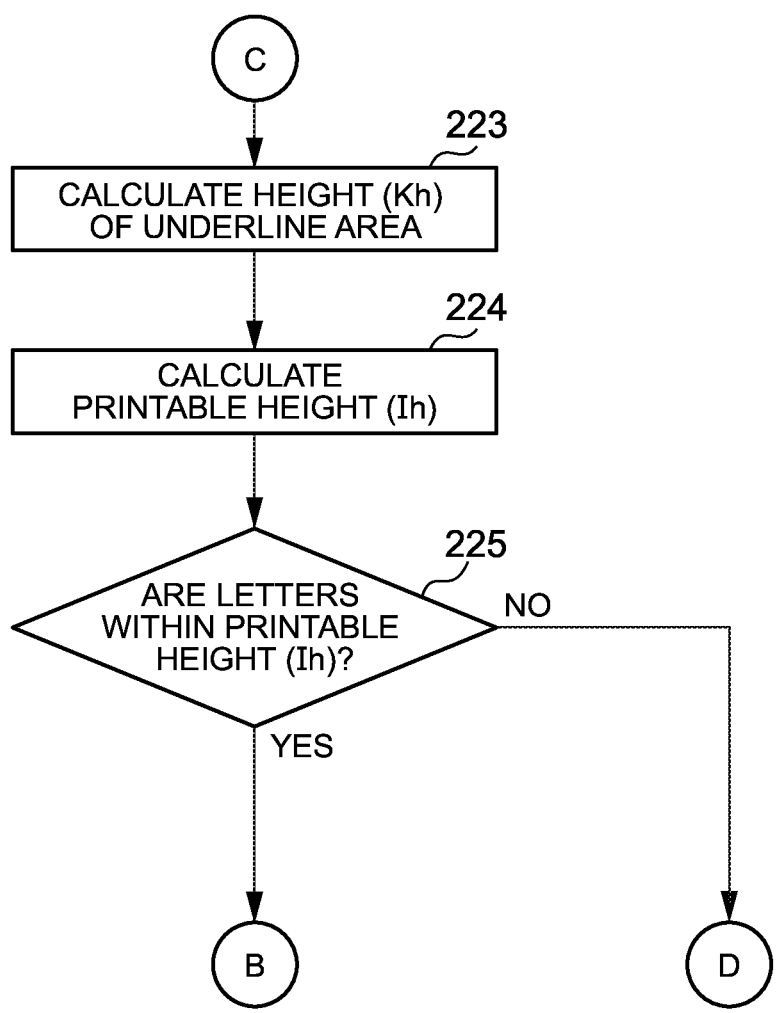
FIG. 11C is a flowchart showing a part of the operation of the printer according to the second embodiment of the present invention.

The above describes the basic processing by the printer, and the following describes the operation of the printer 1 according to the second embodiment again in details, with reference to the flowcharts of FIG. 11A, FIG. 11B and FIG. 11C.

Note here that, prior to the operation of the flowchart of FIG. 11A, the printer 1 reads print data through the communication interface 47, and stores the print data in the RAM 42 as print buffer in association with the amount of movement.

Therefore, the printer becomes ready for printing when the contents of the print buffer are sequentially transferred to the print head 14 in accordance with the amount of movement detected by the optical sensor 15 (move-amount detection part 44).

The following describes the operation of the printer 1 in details.

When a user turns on the power-source button 20, the printer 1 is activated. At Step 201, the controller 30 starts loop processing to determine whether the print instruction button 19 is operated or not until the user operates the print instruction button 19.

When the user sets the print start position marker 17 of the printer 1 at the print start position and operates the print instruction button 19, the procedure shifts to the processing of Step 202 or later.

At Step 202, the controller 30 controls the optical sensor 15 (move-amount detection part 44) to start the detection of the amount of movement of the printer 1 in the main scanning direction.

When detecting the starting of moving based on the detection of the amount of movement, at Step 203, the controller 30 determines whether an underline UL is detected or not based on a result of an image detection processing by the line scanner 16 (image acquisition part 45).

That is, the controller determines whether the border line B2 as stated above is detected or not.

When the material to be printed has an underline UL, the user will place the printer 1 around the underline UL. Therefore such an underline UL will be detected soon after the printer 1 starts to move. That is, this determination is performed soon after the controller detects the starting of the printer based on the detected amount of movement.

When the controller determines at Step 203 that an underline UL is detected, the controller 30 performs the processing of Step 208 or later. When the controller determines that no underline UL is detected, the controller 30 performs the processing of Step 204 or later.

When the procedure shifts to Step 204, since no underline UL is detected, the controller 30 controls the print part 43 to start printing on the material to be printed in accordance with the print data set beforehand.

Specifically, at Step 204, the controller 30 sets any print size that is designated beforehand.

At Step 205, the controller 30 waits for the printer moving forward by the distance between the print head 14 and the print start position marker 17 without printing by the print head 14. After this step ends, at Step 206, the controller 30 controls the print head 14 as the print part 43 to start printing with the size of letters set at Step 204. Then at Step 207, the controller 30 confirms the ending of the printing (e.g., confirms that all of the print buffer is printed), and ends a series of the printing procedure.

On the contrary, when the procedure shifts to Step 208 from Step 203, at Step 208, the controller 30 determines whether a character string CS printed beforehand on the material to be printed is detected or not based on a result of the detection processing using the image acquired by the line scanner 16 (image acquisition part 45).

That is, the controller determines whether the border line B1 as stated above (virtual line along the lower end of the character string CS) is detected or not.

When the controller determines at Step 208 that a character string CS is detected, the controller 30 performs the processing of Step 209 or later. When the controller determines that no character string CS is detected, the controller 30 performs the processing of Step 223 (see FIG. 11C) or later.

When the procedure shifts from Step 208 to Step 209, the underline UL and the character string CS along the main scanning direction are detected at the detection processing based on the image acquired by the line scanner 16 (image acquisition part 45). Therefore at Step 209, the controller 30 sets the lower end of the detected character string CS as the upper border line B1 (a first border line), and sets the upper end of the underline UL as the lower border line B2 (a second border line), and then calculates a distance Kh (this may be referred to as height Kh) of the area in the sub-scanning direction between the upper border line B1 (the first border line) and the lower border line B2 (the second border line).

Next, at Step 210, the controller 30 calculates the printable height Ih considering margins for the height Kh. That is, the controller sets the print border lines M1 and M2 considering the margins for the height Kh, and thus performs area-setting processing to set a print area D.

Setting the print border lines M1 and M2 means setting the coordinate I1 of the print border line M1 and the coordinate I2 of the print border line M2 in the sub-scanning direction.

At Step 211, the controller 30 performs the first comparison processing to determine whether the print width Ch of the print data is within the printable height Ih.

Specifically as described above, the controller 30 compares the coordinate I1 of the upper print border line M1 and the coordinate C1 of the upper end of the print width Ch and compares the coordinate I2 of the lower print border line M2 and the coordinate C2 of the lower end of the print width, and if I1≥C1 and C2≥I2 (see FIG. 12 and FIG. 13A), the controller determines that the print width Ch of the print data is within the printable height Ih. Then, the procedure shifts to Step 212.

Conversely, if this is not the case of I1≥C1 and C2≥I2 (see FIG. 14A and FIG. 15A), the controller determines that the print width Ch of the print data is not within the printable height Ih. Then, the procedure shifts to Step 217 (see FIG. 11B).

As a result of the determination at Step 211 of FIG. 11A, when the procedure shifts to Step 212, the controller 30 compares the first distance IC1 between the upper print border line M1 and the upper end of the print width Ch and the second distance IC2 between the lower print border line M2 and the lower end of the print width Ch.

Then, if the comparison shows that the first distance IC1 is larger than the second distance IC2 as shown in FIG. 12, the data can be printed at the center of the print area D in the sub-scanning direction or closer to the underline UL. Therefore the controller 30 shifts to Step 205 without adjusting the print width Ch.

After that, at Step 205, the controller 30 waits for the printer moving forward by a predetermined distance similarly to the above, and executes print starting and print ending at Step 206 and Step 207, respectively.

On the other hand, when the result of comparison at Step 212 shows that the first distance IC1 is smaller than the second distance IC2 as shown in FIG. 13A, at Step 213, the controller 30 performs the first print-width adjustment processing. In this processing, the controller assigns the value obtained by subtracting the second distance IC2 from the coordinate I1 of the upper print border line M1 to the coordinate C1 of the upper end of the print width Ch and thus reduces the print width Ch so that the first distance IC1 is equal to the second distance IC2 as shown in FIG. 13B.

Such a reduced print width Ch results in the print width Ch located at a center of the print area D in the sub-scanning direction (center between the print border lines M1 and M2 in the sub-scanning direction), so that the print data can be printed at a center of the print area D in the sub-scanning direction.

After Step 213 as stated above, the procedure shifts to Step 214.

At this Step 214, the controller 30 determines whether the print width Ch based on the coordinates (coordinate C1 of the upper end and coordinate C2 of the lower end) changed at Step 213 is a setting value or more.

That is, the controller obtains the print width Ch specifically from the coordinates of the changed print width Ch (coordinate C1 of the upper end and coordinate C2 of the lower end) and calculates the print size (font of graphics and characters to be printed) such that the print data can be printed within the print width Ch. Then the controller determines whether such a print size (font) is a preset size (font) as a minimum value or more.

Then when the print size (font) is the preset size (font) as a minimum value or more, the procedure shifts to Step 215. At Step 215, the controller 30 performs letter-information changing processing. In this processing, the controller sets the coordinates for the print head 14 to print the print data of the calculated printed size (font).

After that, at Step 205, the controller 30 waits for the printer moving forward by a predetermined distance similarly to the above, and executes print starting and print ending at Step 206 and Step 207, respectively.

If such adjustment is not performed, the data will be printed at an upper part of the print area D as illustrated in FIG. 13A. Instead, as a result of the above processing, the printed data can be located at the center of the print area D in the sub-scanning direction favorably as shown in FIG. 13B.

On the other hand, if the print width Ch based on the coordinates (coordinate C1 of the upper end and coordinate C2 of the lower end) changed at Step 213 is less than the setting value, i.e., if the calculated print size (font) is less than the preset size (font) as a minimum value, at Step 216, the controller 30 controls the error output part to output an error message for error warning, and ends the procedure without printing.

Next, referring to FIG. 11B, the following describes the case where the determination at Step 211 results in that the print width Ch of the print data is not within the printable height Ih and the procedure shifts to Step 217.

At this Step 217, the controller 30 determines whether the coordinate I2 of the lower print border line M2 is located above the coordinate C2 of the lower end of the print width Ch.

That is, the controller determines whether the data is printed downward beyond the print area D or not.

When the result of comparison shows that the coordinate I2 is the coordinate C2 or more as shown in FIG. 14A, at Step 218, the controller 30 performs the second print-width adjustment processing. In this processing, the controller assigns the value of the coordinate I2 of the lower print border line M2 to the coordinate C2 of the lower end of the print width Ch and thus reduces the print width Ch so that the print width Ch is within the print area D as shown in FIG. 14B.

On the contrary, when the result of the comparison at Step 217 shows that the coordinate I2 is less than the coordinate C2, the data without adjustment will be printed beyond the print area in the opposite direction to the above, i.e., the data will be printed upward beyond the print area D as shown in FIG. 15A.

Then, at Step 219, the controller 30 performs the second print-width adjustment processing. In this processing, the controller assigns the value obtained by subtracting the second distance IC2 from the coordinate I1 of the upper print border line M1 to the coordinate C1 of the upper end of the print width Ch and thus reduces the print width Ch so that the coordinate C1 of the upper end of the print width Ch is located between the print border line M1 (coordinate I1) and the print border line M2 (coordinate I2) and the first distance IC1 is equal to the second distance IC2 as shown in FIG. 15B.

Such a reduced print width Ch results in the print width Ch located at a center of the print area D in the sub-scanning direction (center between the print border lines M1 and M2 in the sub-scanning direction), so that the print data can be printed at a center of the print area D in the sub-scanning direction.

After Step 218 or Step 219 as stated above, the procedure shifts to Step 220.

When the procedure shifts to Step 220, the situation is exactly the same as that the procedure shifting to Step 214 as stated above.

Therefore a similar determination to Step 214 is performed at Step 220. As a result of the determination, if the procedure shifts to Step 221, a similar determination to Step 215 is performed at Step 221. Subsequently, the procedure shifts to Steps, 205, 206 and 207, and after that, the printing ends.

If such adjustment is not performed, the data will be printed at an upper part or a lower part beyond the print area D as illustrated in FIG. 14A and FIG. 15A. Instead, as a result of the above processing, the data can be printed within the print area D favorably as shown in FIG. 14B and FIG. 15B.

When the procedure shifts to Step 222, error processing similar to Step 216 is executed.

Next, referring to FIG. 11C, the following describes the case where the determination at Step 208 results in that no character string CS printed beforehand on the material to be printed is detected and the procedure shifts to Step 223.

At Step 223, the controller 30 sets the coordinate P1 of the upper end of the print head 14 in the sub-scanning direction as the upper border line B1 (a first border line) and sets the upper end of the underline UL detected from the image acquired by the line scanner 16 (image acquisition part 45) as the lower border line B2 (a second border line), and then calculates a distance Kh (this may be referred to as height Kh) of the entry area above the underline UL in the sub-scanning direction based on the upper border line B1 (the first border line) and the lower border line B2 (the second border line).

Next, at Step 224, the controller 30 calculates the printable height Ih considering margins for the height Kh.

Specifically when the procedure shifts to FIG. 11C, since no character string CS is present above, the print result will not have unnatural appearance resulting from the relationship with the character string CS. Therefore a margin is not necessary on the upper side, and so the controller 30 sets the upper border line B1 (the first border line) as a first print border lines M1.

That is, the controller sets one of the ends of the print width Ch as the upper border line B1 (the first border line), and sets such an upper border line B1 as the first print border line M1.

Next, the controller 30 sets a second print border line M2 while considering a margin for the lower border line B2 (a second border line) for printing so that appearance of the printing is not impaired due to too small distance between the character string "ABC" and the underline UL, and sets the print border lines M1 and M2 considering the margin for the height Kh. In this way, the controller performs the area-setting processing to determine the print area D.

At Step 225, the controller 30 performs first comparison processing to determine whether the print width Ch of the print data is within the printable height Ih.

Specifically since the print width Ch is not across the upper print border line M1, the controller 30 compares the coordinate I2 of the lower print border line M2 and the coordinate C2 of the lower end of the print width, and if C2≥I2 (see FIG. 17), the controller determines that the print width Ch of the print data is within the height Ih. Then, the procedure shifts to Step 205 without adjusting the print width Ch.

At Step 205, the controller 30 waits for the printer moving forward by a predetermined distance similarly to the above, and executes print starting and print ending at Step 206 and Step 207, respectively.

Conversely, if this is not the case of C2≥I2 (see FIG. 16A), the controller 30 determines that the print width Ch of the print data is not within the printable height Ih. Then, the procedure shifts to Step 218 (see FIG. 11B).

At Step 218, the controller 30 performs the second print-width adjustment processing. In this processing, the controller assigns the value of the coordinate I2 of the lower print border line M2 to the coordinate C2 of the lower end of the print width Ch and thus reduces the print width Ch so that the print width Ch is within the print area D as shown in FIG. 16B.

After Step 218 as stated above, the procedure shifts to Step 220.

When the procedure shifts to Step 220, the situation is exactly the same as that the procedure shifting to Step 214 as stated above.

Therefore a similar determination to Step 214 is performed at Step 220. As a result of the determination, if the procedure shifts to Step 221, a similar determination to Step 215 is performed at Step 221. Subsequently, the procedure shifts to Steps, 205, 206 and 207, and after that, the printing ends.

If such adjustment is not performed, the data will be printed downward beyond the print area D as illustrated in FIG. 16A. Instead, as a result of the above processing, the data can be printed within the print area D favorably as shown in FIG. 16B.

When the procedure shifts to Step 222, error processing similar to Step 216 is executed.

That is the specific descriptions on the printer 1 of the present invention, by way of the embodiments. The present invention is not limited to the specific embodiments, and it will be appreciated for a person skilled in the art from the appended claims that the specific embodiments can be modified or improved in various ways, and such modified or improved embodiments fall within the technical scope of the present invention.

What is claimed is:

1. A printer comprising:
 a processor;
 a print head configured to perform printing on a material in accordance with input print data; and
 a scanner configured to acquire an image of the material on which the print data is to be printed,
 wherein the processor is configured to:
  detect at least one line extending in a first direction on the material from the image acquired by the scanner when the printer moves in a moving direction in which the scanner is on a leading side of the print head, and
  set a print area along the first direction based on the detected at least one line on the material, and
 wherein the print head prints the print data on the material in the print area set by the processor.

2. The printer according to claim 1, wherein the processor is further configured to perform determination processing to determine whether a print width set for the print data is within a width of the print area in a second direction orthogonal to the first direction.

3. The printer according to claim 2, wherein the processor is further configured to:

perform detection processing to detect, as the at least one line, a first line and a second line extending in the first direction on the material from the image, and
 area-setting processing to set a first print border line and a second print border line of the print area along the first direction so as to provide a margin in the second direction to each of the first line and the second line, and
 wherein the processor performs the determination processing based on whether the print width is between the first print border line and the second print border line.

4. The printer according to claim 3, wherein the processor is further configured to:
 when the print width is within the width in the second direction of the print area on the material, perform first comparison processing to compare a first distance between a first end of the print width and the first print border line and a second distance between a second end of the print width and the second print border line, and
 perform first print-width adjustment processing to adjust the print width so that one of the first distance and the second distance that is determined to be smaller in the first comparison processing is equal to the other of the first distance and the second distance that is determined to be larger.

5. The printer according to claim 4, wherein the processor is further configured to, when the print width is not within the width in the second direction of the print area on the material, perform second print-width adjustment processing to reduce the print width so that one of the first end and the second end of the print width that is not between the first print border line and the second print border line is located between the first print border line and the second print border line, and
 wherein in the second print-width adjustment processing, the processor is configured to, when the first end is not within the first print border line and the second print border line, reduce the print width so that a first distance between the first end and the first print border line is equal to a second distance between the second end and the second print border line, and when the second end is not within the first print border line and the second print border line, reduce the print width so that the second distance is equal to the first distance.

6. The printer according to claim 4, further comprising a sensor configured to detect an amount of movement,
 wherein the processor is further configured to calculate a print size of the print data based on the print width, and when the calculated print size is a preset size or more, to control the print head to start printing of the print data with the calculated print size on the material when a detection result of the amount of movement by the sensor reaches a preset amount of movement.

7. The printer according to claim 3, further comprising a sensor configured to detect an amount of movement,
 wherein the processor is further configured to, when a detection result of the amount of movement by the sensor reaches a preset amount of movement, and when the first line and the second line are not detected from the image, control the print head to start printing on the material in accordance with print data set beforehand.

8. The printer according to claim 3, wherein a length of the scanner in the second direction is larger than a length of the print head in the second direction.

9. The printer according to claim 2, wherein the processor is further configured to:

perform detection processing to detect, as the at least one line, a second line printed in the first direction on the material from the image, perform first-line determination processing to, when a character string along the first direction is detected to be closer to a first end of the print width on the material from the image, determine a first line along the first direction based on the character string, and perform area-setting processing to set a first print border line and a second print border line of the print area so as to provide a margin in the second direction to each of the first line and the second line and so as to specify the print area, and wherein the processor performs the determination processing based on whether the print width is between the first print border line and the second print border line.

10. The printer according to claim 2, wherein the processor is further configured to:

perform detection processing to detect, as the at least one line, a second line printed in the first direction on the material from the image, perform first-line determination processing to determine a first line along the first direction based on a first end of the print width, and perform area-setting processing to set a second print border line of the print area so as to provide a margin in the second direction orthogonal to the first direction to the second line and set the first line as a first print border line of the print area so as to specify the print area, and wherein the processor performs the determination processing based on whether the print width is between the print border lines.

11. A method for controlling a printer, the printer including (i) a print head configured to perform printing on a material in accordance with input print data, and (ii) a scanner, the method comprising:

when the printer moves in a moving direction in which the scanner is on a leading side of the print head, acquiring, with the scanner, an image of the material on which the print data is to be printed;

detecting at least one line extending in a first direction on the material from the image acquired by the scanner, and setting a print area along the first direction based on the detected at least one line on the material; and printing, with the print head, the print data on the material in the print area having been set.

12. A non-transitory recording medium having stored thereon a program for controlling a printer, the printer including (i) a controller, (ii) a print head configured to perform printing on a material in accordance with input print data, and (iii) a scanner, the program controlling the controller to execute processes comprising:

when the printer moves in a moving direction in which the scanner is on a leading side of the print head, acquiring, with the scanner, an image of the material on which the print data is to be printed; and detecting at least one line extending in a first direction on the material from the image acquired by the scanner, and setting a print area along the first direction based on the detected at least one line on the material.

* * * * *